(12) United States Patent
Thyagharajan et al.

(10) Patent No.: US 11,875,555 B2
(45) Date of Patent: Jan. 16, 2024

(54) APPLYING SELF-CONFIDENCE IN MULTI-LABEL CLASSIFICATION TO MODEL TRAINING

(71) Applicant: Intel Corporation, Santa Clara, CA (US)

(72) Inventors: Anirud Thyagharajan, Karnataka (IN); Prashant Laddha, Bengaluru (IN); Benjamin Ummenhofer, Unterhaching (DE); Om Ji Omer, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 17/534,558

(22) Filed: Nov. 24, 2021

(65) Prior Publication Data

US 2022/0084310 A1 Mar. 17, 2022

(30) Foreign Application Priority Data

Sep. 30, 2021 (IN) .............................. 202141044385

(51) Int. Cl.
*G06V 10/774* (2022.01)
*G06V 10/77* (2022.01)
*G06V 10/776* (2022.01)

(52) U.S. Cl.
CPC ........ *G06V 10/7753* (2022.01); *G06V 10/776* (2022.01); *G06V 10/7715* (2022.01)

(58) Field of Classification Search
CPC ........... G06V 10/7753; G06V 10/7715; G06V 10/776; G06V 10/774; G06V 10/82
See application file for complete search history.

(56) References Cited

U.S. PATENT DOCUMENTS

2019/0005358 A1* 1/2019 Pisoni .................... G06V 10/82
2019/0130230 A1* 5/2019 Kang .................. G06F 18/2433
(Continued)

FOREIGN PATENT DOCUMENTS

WO   WO-2021086671 A1 * 5/2021 ......... G06K 9/00147

OTHER PUBLICATIONS

Muzahid et al, 3D Object Classification Using a Volumetric Deep Neural Network, 2020, IEEE Access, 8: 23802-23816. (Year: 2020 ).*

(Continued)

*Primary Examiner* — John Villecco
*Assistant Examiner* — Kathleen M Broughton
(74) *Attorney, Agent, or Firm* — Akona IP PC

(57) ABSTRACT

A computer model is trained to classify regions of a space (e.g., a pixel of an image or a voxel of a point cloud) according to a multi-label classification. To improve the model's accuracy, the model's self-confidence is determined with respect to its own predictions of regions in a training space. The self-confidence is determined based on the class predictions, such as a difference between the highest-predicted class and a second-highest-predicted class. When these are similar, it may reflect areas for potential improvement by focusing training on these low-confidence areas. Additional training may be performed by including modified training data in subsequent training iterations that focuses on low-confidence areas. As another example, additional training may be performed using the self-confidence to modify a classification loss used to refine parameters of the model.

23 Claims, 10 Drawing Sheets

(56) References Cited

U.S. PATENT DOCUMENTS

| | | | | |
|---|---|---|---|---|
| 2020/0394458 | A1* | 12/2020 | Yu | G06V 10/82 |
| 2021/0027485 | A1* | 1/2021 | Zhang | G06T 7/11 |
| 2021/0103776 | A1* | 4/2021 | Jiang | G06V 20/647 |
| 2021/0201661 | A1* | 7/2021 | Al Jazaery | G08C 23/00 |

OTHER PUBLICATIONS

Bendale, Abhijit et al "Towards Open Set Deep Networks", 2016 IEEE Conference on Computer Vision and Pattern Recognition (CVPR), 2016, retrieved on Oct. 5, 2021 from https://openaccess.thecvf.com, pp. 1563-1572.

Crammer, Koby et al "Confidence-Weighted Linear Classification for Text Categorization", Journal of Machine Learning Research 13 (2012) 1891-1926.

Crammer, Koby et al "Multi-Class Confidence Weighted Algorithms", Proceedings of the 2009 Conference on Empirical Methods in Natural Language Processing, (2009) pp. 496-504.

Durand, Thibaut et al."Learning a Deep ConvNet for Multi-Label Classification with Partial Labels", 2019 IEEE/CVF Conference on Computer Vision and Pattern Recognition (CVPR), 2019, retrieved on Oct. 5, 2021 from https://openaccess.thecvf.com, pp. 647-657.

Gal, Yarin et al "Dropout as a Bayesian Approximation: Representing Model Uncertainty in Deep Learning", ICML'16: Proceedings of the 33rd International Conference on International Conference on Machine Learning—vol. 48, Jun. 2016 pp. 1050-1059.

Ibrahim, Karim M. et al "Confidence-based Weighted Loss for Multi-label Classification with Missing Labels", The 2020 International Conference on Multimedia Retrieval (ICMR '20), Jun. 2020, Dublin, Ireland, 6 pages.

Lin, Tsung-Yi et al, "Focal Loss for Dense Object Detection", 2017 IEEE International Conference on Computer Vision (ICCV), retrieved on Oct. 5, 2021 from https://openaccess.thecvf.com, pp. 2980-2988.

Papadopoulous, Georgios et al "Confidence Estimation Methods for Neural Networks: A Practical Comparison", IEEE Transactions on Neural Networks, vol. 12, No. 6, Nov. 2001, pp. 1278-1287.

Rodrigues, Fillipe M. et al "Using Confidence Values in Multi-label Classification Problems with Semi-Supervised Learning", The 2013 International Joint Conference on Neural Networks (IJCNN), 2013, 8 pages.

Wallace, Byron C. et al "Class Imbalance, Redux", 2011 11th IEEE International Conference on Data Mining, 2011, pp. 754-763.

* cited by examiner

APPLYING SELF-CONFIDENCE IN MULTI-LABEL CLASSIFICATION TO MODEL TRAINING

CROSS-REFERENCE TO RELATED APPLICATIONS

The present application claims priority to Indian Provisional Patent Application No. 202141044385, filed on Sep. 30, 2021, the contents of which are hereby incorporated by reference in its entirety.

TECHNICAL FIELD

This disclosure relates generally to computer modeling, and particularly to improvement of multi-label classification training using model-determined label confidence.

BACKGROUND

Multi-label classification is a common task in various research fields such as image classification, video classification, audio auto-tagging and text categorization. In multi-label classification, a computer model attempts to label a particular input with one of several different classes.

Additionally, there is a lack of visibility (or interpretability) in assessing the misclassifications of a network, inhibiting effective learning from such misclassifications.

Previous works have the following problems: (i) they do not differentiate between various members of a class, which could further result in propagating improper errors, and (ii) the weights (of the loss, such as the classwise weights) do not evolve over time based on how confident the model is in predicting the sample.

As discussed below, the present disclosure provides an approach using the computer model's "self-confidence" for identifying additional training for improving network performance.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
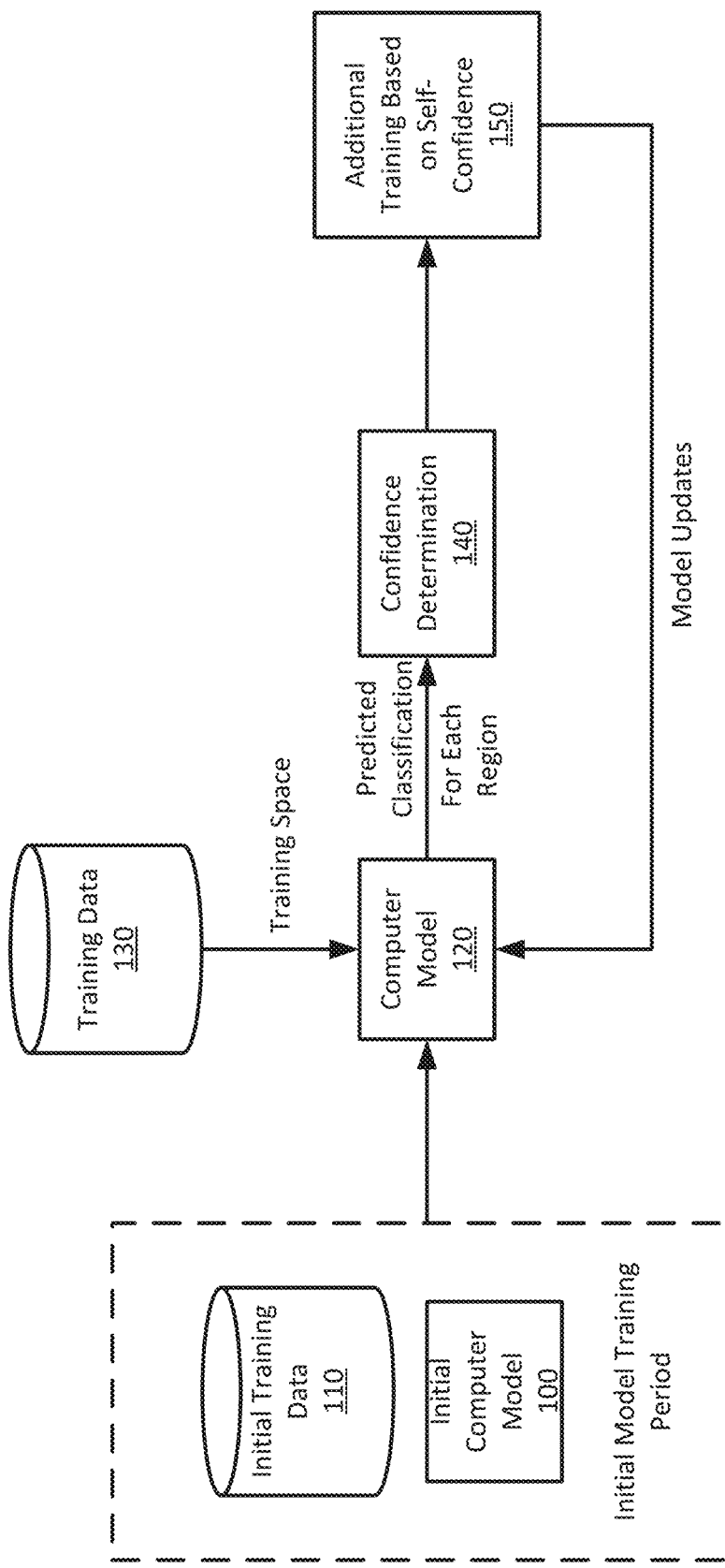
FIG. 1 is an example overview flow for applying a model's self-confidence to improve training of the model.

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Described herein are approaches for using a computer model's confidence in multi-label classification to further refine the computer model's accuracy. The computer model generates a plurality of classification predictions, representing the respective prediction that a portion of an input belongs to each of the particular classes. The input to the model as discussed herein is generally referred to as a "space" and may be a two or three-dimensional area represented by individual regions within the space, such as points or discrete volumes making up the space (e.g., a pixel or voxel). The model's "confidence" may be determined based on the similarity of the class having the highest prediction (i.e., the most-likely class) and other classes that were also highly predicted, such as the next-most-likely class. The confidence score may thus be generated on a per-region basis, as each portion or region of the input (e.g., a two-dimensional or three-dimensional space) may be evaluated by the computer model to generate a set of predictions. The per-region confidence score may then be used to modify subsequent training of the model to focus the training on these areas of "low-confidence." Since the model may have already been trained with an initial loss function (which may also be termed an error or cost function), the model may be expected to have directly gained whatever benefit that labeled data may provide. By focusing on "low-confidence" regions, subsequent training iterations may focus on further refining parameters based on more difficult (according to the model's own predictions) problems and provide a way to further refine the model's accuracy.

In one approach, the system training the model uses the model's self-confidence to augment/modify training data for use in subsequent training. Rather than include all regions or areas in the space for training the model, the self-confidence may be used to select regions in a training space for which the model has a "low" self-confidence and include exclude regions for which the model has a "high" self-confidence. By including "low-confidence" regions in the modified training space, the model may be presented with additional examples of training data specifically designed to focus training on regions that the model has difficulty successfully predicting with confidence. In one embodiment of this approach, the regions are grouped according to their known labels, and the grouped regions are included or excluded together based on the frequency that the computer model had low confidence in predicting regions in the group. That is, the grouped regions may be designated as a "low-confidence group" or a "high-confidence group" in this embodiment and included (or excluded) from the modified training space based on the designation.

In another approach, the system training the model uses the self-confidence to modify the loss function for training parameters of the model. In this example, the loss function is modified to relatively increase the weight in the loss function of "low-confidence" regions and relatively decrease the weight of "high-confidence" regions. In one example, the self-confidence score is used to directly modify the loss function on a per-region basis based on the self-confidence of the prediction for that region. In this example, the loss function for a region with low self-confidence is accorded higher weight. In other examples, the regions may be grouped according to the known labels and determine the frequency that regions within the groups have low confidence (e.g., the portion of regions for a particular label for which the model has doubt). In this example, the regions may modify the loss function based on the group assigned to the region and the frequency of the low-confidence occurring for the region in the group. Each of these approaches and the additional approaches as discussed below may be combined as suitable for a given application of the techniques described herein.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. The meaning of "a," "an," and "the" include plural references. The meaning of "in" includes "in" and "on."

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. The terms "substantially," "close," "approximately," "near," and "about," generally refer to being within +/−20% of a target value. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

Classification Confidence

FIG. 1 is an example overview flow for applying a model's self-confidence to improve training of the model. The initial computer model 100 (and computer model 120) is a multi-class (or multi-label) classification model that outputs a prediction for each of several classifications. For computer vision problems, for example, the multi-label classification may generate a prediction for each of several different types of objects, such as a chair, ball, lamp, car, and so forth. As used herein, "self-confidence" refers to a computer model's estimated prediction of a highest-scoring (or highest-predicted) class and its relative certainty as measured by the model's estimated likelihood that the input could be another class.

In general, the initial computer model 100 receives a portion of an input and outputs a prediction of class membership for the different classes for that portion of the input. For example, in computer vision applications, as generally discussed herein, the input may be a space, such as a two- or three-dimensional area in which individual portions of the space are evaluated by the model. The space may be represented as pixels, voxels, a point cloud, or any other suitable representation. Individual portions of the space that are processed by the model to generate predictions are termed "regions" of the space. For example, in computer vision applications, individual voxels of a three-dimensional space may be processed to predict, for each individual voxel of the space, what object is at that voxel. While the discussion below generally relates to inputs in which spaces and constituent regions are processed by the respective computer models, this disclosure also applies to other types of computer models and input data for which self-confidence scores may be used to modify and improve training of the model.

As discussed below with respect to FIGS. 8-9, computer models typically include parameters that are used to process inputs to predict outputs. Such computer models may be iteratively trained to learn parameters, including weights, for predicting various outputs based on input data. As discussed further in FIG. 9, individual layers in a neural network may receive input activations and process the input activations to generate output activations of the layer. Computer models that may trained using the disclosed approaches may include the types discussed below, including various types of neural networks. The initial computer model 100 may be trained using a set of initial training data 110 according to techniques known in the art, for example using a portion of the available training data. In one embodiment, the initial training period continues until the model parameters have stabilized and are not significantly changing after each batch of training. In other embodiments, the initial training period may use a designated percentage or amount of the available training data as the initial training data 110. In general, the initial training period trains the parameters of the initial computer model 100 such that the computer model's predicted classes have learned substantially from the initial training data and are improved relative to initialization of the computer model.

After the initial training, the computer model 120 and its parameters are available for further training and refinement. To further improve the computer model 120, the computer model 120 is applied to a training space from a training data 130. For each region of the training space, the computer model makes a predicted classification for the plurality of classes, from which the model's self-confidence is determined 140. Using the self-confidence, additional training for the model is applied based on the self-confidence to update the model parameters for the computer model 120. These various aspects and additional embodiments are discussed in additional detail below.

Figure 2:
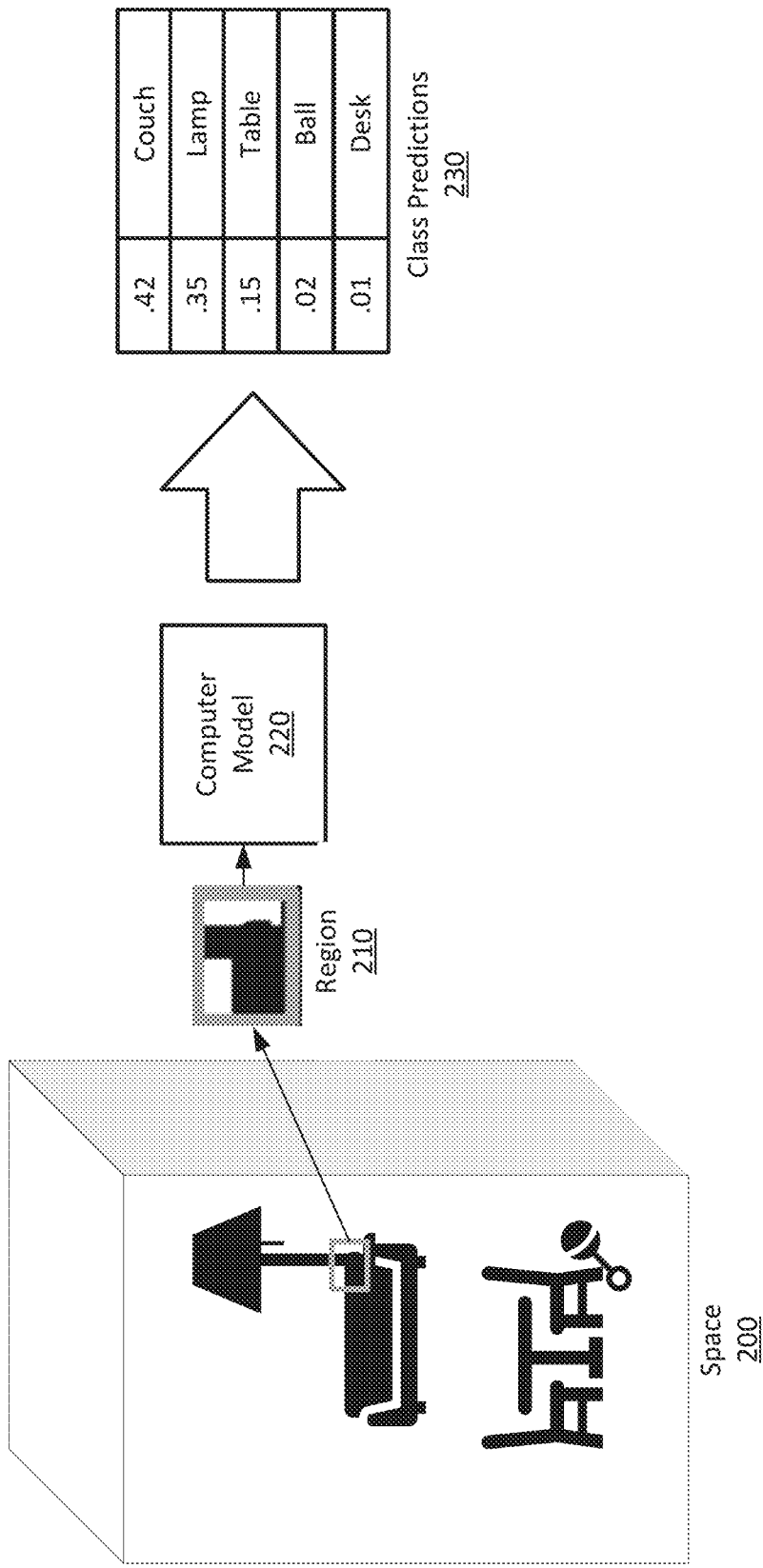
FIG. 2 shows an example class prediction for a region of a space by a multi-label computer model, according to one embodiment.

FIG. 2 shows an example class prediction for a region of a space by a multi-label classification computer model, according to one embodiment. As shown in this example, a space 200 is a three-dimensional space in which multiple objects are included. The space 200 may be represented as a pointcloud, individual voxels, and any other suitable representation. As noted above, spaces may include two- or three-dimensional areas according to the configuration of the computer model and its application. As noted above, the computer model 220 receives a region 210 of the input for evaluation. For example, the model may attempt to label or classify individual pixels, voxels, or other discrete spaces. In practice, the model may receive and evaluate an area around the specific point of interest as a region to be evaluated. For example, in computer vision applications the computer model 220 may apply a sliding window of 3×3, 5×5, or larger pixel sizes to be evaluated by the model for classification, such that the "pixel" being labeled is at the center of the sliding window. In other examples, the entire window may constitute the region 210 being labeled by the computer model 220. As shown in FIG. 2, the region may comprise a small portion of the space 200 as a whole. In this example, the space 200 includes a table, chairs, a toy, a couch, and a lamp. In supervised learning data sets, the space 200 may also have associated labels which the computer model 220 attempts to learn, for example indicating which portions of the space 200 constitute the various objects. As depicted in the example of FIG. 2, the region 210 evaluated by the computer model 220 is a part of the space 200 including parts of both the couch and the lamp in the space 200. When the computer model 220 is applied to this region 210, the class predictions 230 include the highest likelihood that the region should be classified as a couch, followed by a lamp, and then a table. In many computer models, the class predictions 230, as output by the model, represent percentage predictions that together sum to 1. For example, the final layer of the classification may include a softmax or other layer to normalize the results of the network, e.g., into a probability distribution across the classes. In one example, the class predictions are represented as an array in which each element of the array indicates a prediction for the associated class for that element. In some configurations, the class predictions are output as an array of logits representing the prediction for each class. As shown in this example, the region 210 yields similar class predictions for a couch and a lamp; while the computer model successfully classified the region 210 as a couch, the prediction was somewhat close between the "couch" and "lamp" classifications. In other examples, the prediction may err (the highest prediction is not the correct class, as indicated by the known class value of the region in the training data), while the correct class is a close prediction to the incorrect class.

Figure 3:
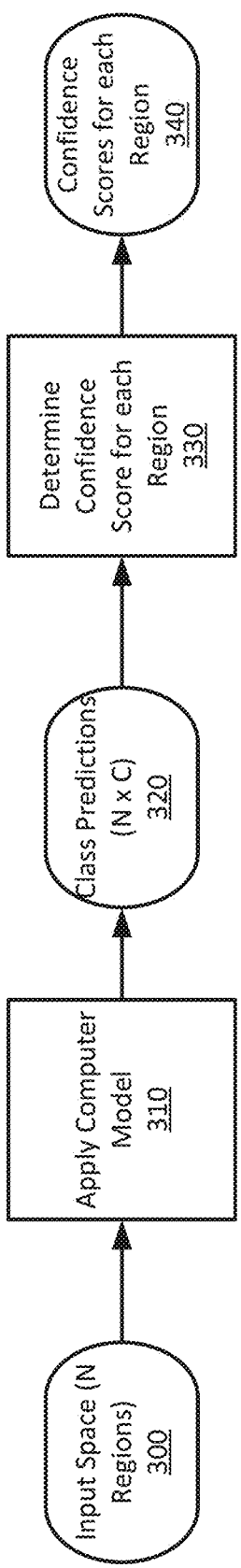
FIG. 3 shows one example for determining confidence scores for an input space according to one embodiment.

FIG. 3 shows one example for determining confidence scores for an input space according to one embodiment. As discussed above, an input space 300 may include a plurality of individual regions that may be assessed by the computer model 310 based on the current parameters of the computer model. Thus, the input space may be considered as having N regions that the computer model is applied to 310 to generate a set of class predictions 320. As discussed in FIG. 2, each region within the input space 300 may be evaluated by the computer model and a plurality of class predictions is generated by the model based on the region input to the model. Accordingly, the class predictions generated by the model may include C class predictions for each of the input regions. As noted above, the C class predictions may be represented as an array having C elements. Each input space, having N regions, thus may generate a class prediction for each class (C predictions) for each of the N regions, which may result in a matrix of size N×C class predictions 320 for the complete input space.

Using the class predictions, the system training the computer model determines 330 a confidence score for each region 340. In one embodiment, each region is assigned one confidence score, yielding a set of N confidence scores for the N regions within the input space. The confidence score may be determined in a variety of ways to reflect the relative certain/uncertainty of the model in its prediction for a given region. As one example data set, class predictions of [0.60, 0.15, 0.10] as the top-3 class predictions suggests more "confidence" in the highest-predicted class as expressed by the model compared to class predictions of [0.35, 0.30, 0.20]. While in both cases the same class may have been identified as most-likely, the distribution of predicted values in the second example is narrower and suggests the model's prediction of the first class could have more easily been changed by smaller changes in the input, and that there may be an opportunity to focus the model training on learning parameters to more sharply distinguish the classes. Thus, the confidence may be termed a "self-confidence" in that the confidence score can be determined based on the model's predictions as an unsupervised analysis of the class predictions. This also allows for automatic modification of training based on the confidence score without requiring human intervention to analyze or select classes or regions for further analysis.

In various embodiments, the confidence score is determined by comparing the prediction for the highest-predicted class (i.e., the class expressed by the model as the most-likely class for the region) with other predicted classes. In one embodiment, the highest-predicted class is compared with the next-highest predicted class to determine the difference in predicted likelihood between the highest prediction and the next-best prediction. Though termed the "highest" prediction, in some circumstances the prediction for the "highest" or most-strongly predicted class may represent a low percentage likelihood that the region is that class. In various situations, the "highest" class prediction may be under 50, 40, 30, or 20 percent, depending on the distribution and sparseness of the class predictions C. The highest-predicted class may be compared with more than one other class prediction to determine the confidence score. To determine a confidence score using this approach, the class predictions may be sorted by highest to lowest class prediction. The sorted list may then be analyzed to determine the difference between the highest-predicted class and the next-highest predicted class. Thus, one example confidence score, after sorting the array of class predictions C by prediction value, is defined by the function: $f_{conf} = C_0 - C_1$. The confidence scores for each region in the input space may also be stored as an array, such that $f_{conf}[i]$ denotes the confidence value for region i in the input space.

In other embodiments, the confidence score may be determined with other analysis of the class predictions for the region, such as the average difference between the highest-predicted classes or other metrics for evaluating the degree to which other classes were predicted similarly to the highest-predicted class. For example, the spread or standard deviation of a number of highest-predicted classes may be used in determining the confidence score. For example, the highest 3 or 5, or another number of highest-predicted classes (within the predicted set for the region i) to determine the extent to which another class (or set of classes) was predicted close to the value of highest-predicted class. As another simple example, the prediction value of the highest class prediction may be used as the confidence score, particularly when the class prediction represents a probability. In this situation, the probability (e.g., a percentage likelihood) represents a "confidence" of the model.

Data Augmentation with Self-Confidence

Figure 4:
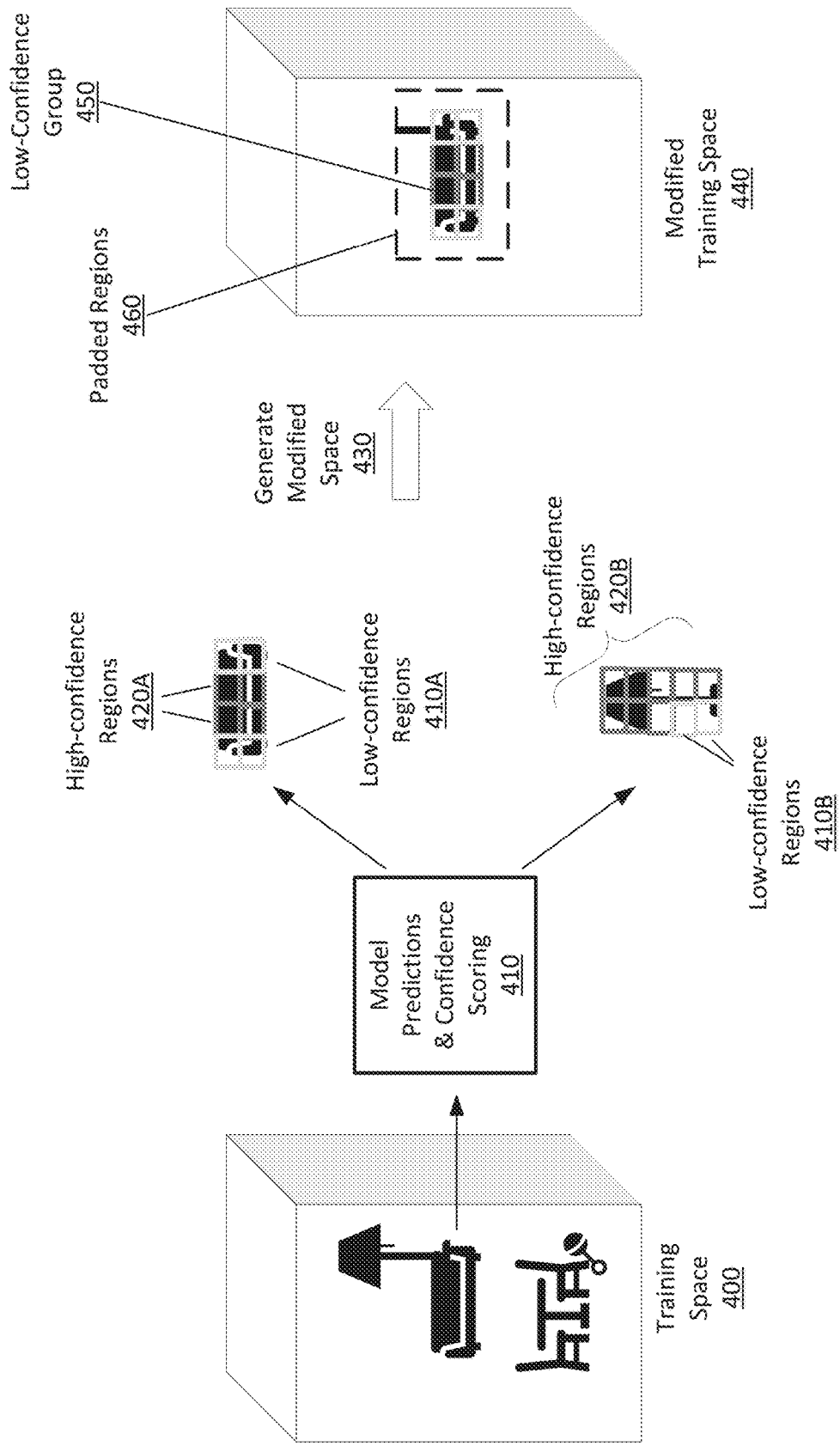
FIG. 4 shows an example of modifying training for the computer model based on confidence scores for a training space, according to one embodiment.

FIG. 4 shows an example of modifying training for the computer model based on confidence scores for a training space, according to one embodiment. The training space 400 is a part of the training data for the computer model and may have labeled regions representing known labels for the regions, representing the ground truth classifications for the training space). The known labels are the classifications that the model, after training, is intended to learn to reproduce, and thus indicate the "correct" class of a region.

In the embodiment shown in FIG. 4, the training space is analyzed to identify classes to include or remove in a modified training space 440. In one embodiment, the regions associated with each class is identified, and the number (or a proportion) of regions having low confidence scores is determined and used to modify the training space 400. Classes with more or fewer regions of relatively high or relatively low confidence may be identified and used to generate 430 the modified training space 440 and focus training on classes having more regions of low confidence.

As discussed with respect to FIGS. 1-3, the current parameters of the model are applied to the training space 400 to generate a set of class predictions C and a confidence score $f_{conf}$ for each region i in the training space 400. For simplicity, FIG. 4 shows modified training space using two classes as examples: the "couch" and the "lamp" classes. As discussed further in FIG. 5, the regions associated with the known classes (e.g., the ground truth classes) are grouped into subsets, such that the regions of each type of class/object can be evaluated. In this example, the "couch" class includes four low-confidence regions 410A and four high-confidence regions 420A, designed by lighter and darker boxes, respectively, in FIG. 4. The "lamp" subset includes ten regions in FIG. 4, including eight high-confidence regions 420B and two low-confidence regions 410B. The determination of a "low-confidence" and a "high-confidence" region, along with further analysis thereof is discussed with respect to FIG. 5. Based on the confidence score of the regions within a subgroup, the computer model training system may generate a modified training space 440 that includes classes having regions of relatively low confidence. Based on the regions within each class, a class may be assigned to one of several groups, such as a "low-confidence group" or a "high-confidence group." The designation to a group may thus determine how the training space is modified with the regions belonging to the class. In one embodiment, the "high-confidence group" regions are removed from the modified training space 440. In addition, the low-confidence group 450 (e.g., the "couch" group) may be included in the modified training space 440. In this example, the modified training space 440 thus includes groups of regions with low confidence, while removing other portions of the training space. In an additional configuration, while the high-confidence groups may be removed, the areas around the low-confidence group 450 may be added to the modified training space 440 as padded regions 460 around the low-confidence group 450. In many applications, the evaluation of a region (e.g., a voxel or pixel) may include portions of the space near and around the region itself. For example, to successfully classify a region of 3×3 or 5×5 pixels in an image, the context of the surrounding pixels may also be included in the input to the computer model in predicting the region's classification. The padded regions 460 include such similar context for the low-confidence group 450 in the modified training space 440. In further examples, the training labels (e.g., the known classification) may be included with the modified training space 440 for the regions of the low-confidence group 450 (here, labels that the region belong to class "couch"), while the labels related to the padded regions 460 are omitted in one embodiment so that the training algorithm does not apply a loss function for the padded regions 460 of classes which are only partially included in the modified training space 440. For example, as shown in FIG. 4, the padded regions 460 in this example includes a portion of the lamp.

Figure 5:
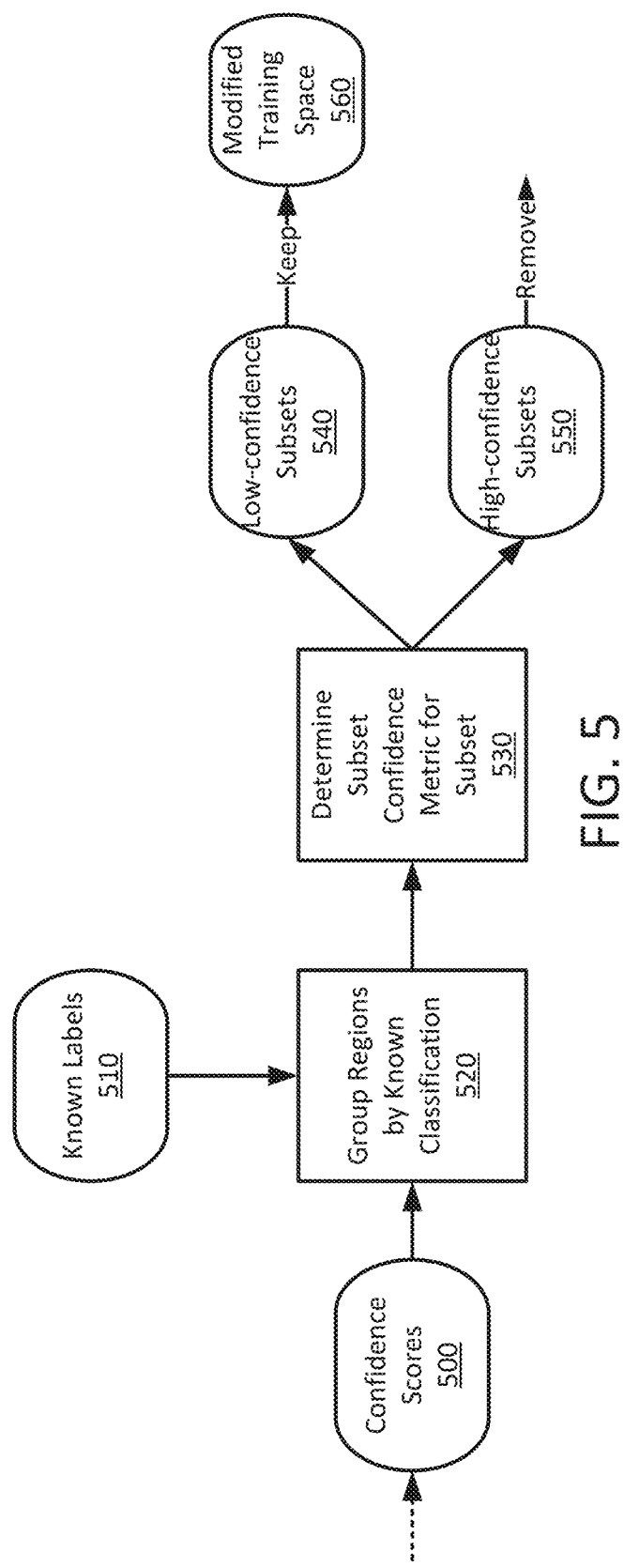
FIG. 5 shows an additional flow for generating a modified training space based on confidence scores, according to one embodiment.

FIG. 5 shows an additional flow for generating a modified training space based on confidence scores, according to one embodiment. As discussed above, confidence scores 500 are generated by applying the computer model to the regions of the training space (e.g., individual pixels, voxels, points in a pointcloud, etc.). The training space is associated with known labels 510 for the regions in the space. To determine the modified training space 560, the regions in the space are grouped according to the known classifications 520 of the regions. In one embodiment, all regions having a particular classification (e.g., all regions labeled "couch") are grouped in a subset. In other embodiments, regions are grouped for a class when they are contiguous or substantially contiguous (e.g., within a threshold distance within the space), rather than forming groups of every region for the class. For example, the space may be a living room in which two couches are labeled and each couch is associated with separate regions a distance apart from one another. While the known labels 510 may not explicitly distinguish the two "instances" of a couch, by grouping regions that are within a threshold distance permits the individual "instances" to be automatically grouped and evaluated for the modified training space. This may be beneficial, for example, when some classes are identified with high confidence in some circumstances, but not in others, permitting each subset of the class to be separately evaluated for treatment in the modified training space 560.

Next, each subset of regions is evaluated to determine whether the subset should be assigned as "low-confidence" or "high-confidence." Rather than individually characterizing regions, in this example the subset of regions for the class (according to known labels 510) is labeled, hence determining a group of low-confidence subsets 540 and a group of high-confidence subsets 550.

To determine the relative confidence assignment of a subset, the confidence scores of the regions within the subset are summarized to determine a confidence metric for the subset. The confidence metric provides a means for comparing the relative confidence of the various region subsets.

In some embodiments, the confidence score for the regions within the subset may be averaged to determine a mean or median value as the subset confidence metric.

In other examples, each region may be characterized as a low or high confidence region by comparing the confidence score of the region to a confidence score threshold. The confidence score threshold may be a constant value in various embodiments, and in other embodiments may be determined based on statistics of the confidence scores 500. For example, the threshold may be set within the 20-80$^{th}$ percentile of confidence scores among the regions in the particular training space, or among the regions across training spaces in a wider training data set. After determining whether each region is relatively high or low confidence, in one embodiment a ratio of the low-confidence to high-confidence regions is determined and used as the determined subset confidence metric 530. In various configurations, other methods for characterizing the confidence scores of the regions within a subset may be used.

Using the subset confidence metric, the training system assigns region subsets as a group of low-confidence subsets 540 or a group of high-confidence subsets 550. The determination of "high" and "low" subsets may use various approaches. In one example, the subset confidence metric is compared to a fixed threshold. For example, when the confidence metric is the mean confidence score of the regions in the subset, the fixed threshold may be a specific mean confidence score. As another example, when the confidence metric is a ratio of low-confidence to high-confidence regions, the threshold may designate a subset as low-confidence when more than 1:1, 1:2, 1:3, 1:4, and so forth of the regions are characterized as low-confidence. Other fixed thresholds generally may be used to determine whether a subset is characterized as low or high confidence, including a combination of such metrics. In further embodiments, the assignment of region subsets may be dynamically determined similar to the region confidence determination noted above. For example, the subset confidence metrics for all subsets may be statistically analyzed to determine percentile distributions of the region subsets with respect to the subset confidence metric. The region subsets may be assigned to the group of high or low confidence subsets based on a threshold set by the percentile of the subset confidence metric. This approach may permit, for example, a desired portion of the training space to be considered low or high confidence for populating the modified training space 560.

Using the assignment of region subsets to the group of low-confidence subsets 540 or the group of high-confidence subsets 550, the modified training space 560 is generated as discussed at FIG. 4, for example to remove high-confidence subsets 550 and keep low-confidence subsets 540 with added padding regions.

Although two types of groups are shown here, in various embodiments multiple types of groups may be used to characterize the confidence level of the model with respect to region subsets. Such additional subsets may also remain in the modified training space 560, or may do so based on additional factors, such as the predictive accuracy of the model relative to the class of the regions in the subset (e.g., based on the known labels 510) or relative to the frequency that the class is represented in the training set of data as a whole (e.g., keeping classes which occur less frequently than the mean and removing classes which occur more frequently). This may allow the confidence of the subset to further augment class skew in the training data.

Returning briefly to FIG. 1, the generation of modified training sets may be performed after the initial computer model 100 is trained, such that the training data for further iterations includes a set of training data 130 and one or more sets of modified training data including modified training spaces as discussed with respect to FIGS. 4-5. In some embodiments, some or all of the training spaces in initial training data 110 and training data 130 is processed to determine a set of modified training spaces as discussed above. To use the modified training spaces, in one embodiment the modified training spaces are included in a training iteration with the known labels. In embodiments in which a large number of additional training iterations are performed, the batch of training data used for a particular iteration may be selected from the unmodified training set (e.g., training data 130) and from the set of modified training spaces. The proportion of data selected from the modified and unmodified training sets may vary, and in particular embodiments may be selected at a 2:1, 1:1, 1:2, or other suitable ratios. The percentage of training data selected from the modified and unmodified training set may also be randomized or semi-randomized. In addition, the portion of training data selected from each group may be modified based on the number of training iterations, for example to increase the amount selected from the modified training set as the number of training iterations increases.

The modified training data may be generated once after the initial model is trained or may be generated after further training iterations of the computer model that used self-confidence based training (e.g., a set of modified training data or the loss modification discussed below). Thus, the modified training data may be generated after the initial training, and a second set of modified training data may be generated after a number of iterations of the first modified training data. This permits the additional model revisions to express its confidence (or lack thereof) in the second set of modified training data, enabling further training to account for the modified parameters of the model after the additional training.

Loss Modification with Self-Confidence

Figure 6:
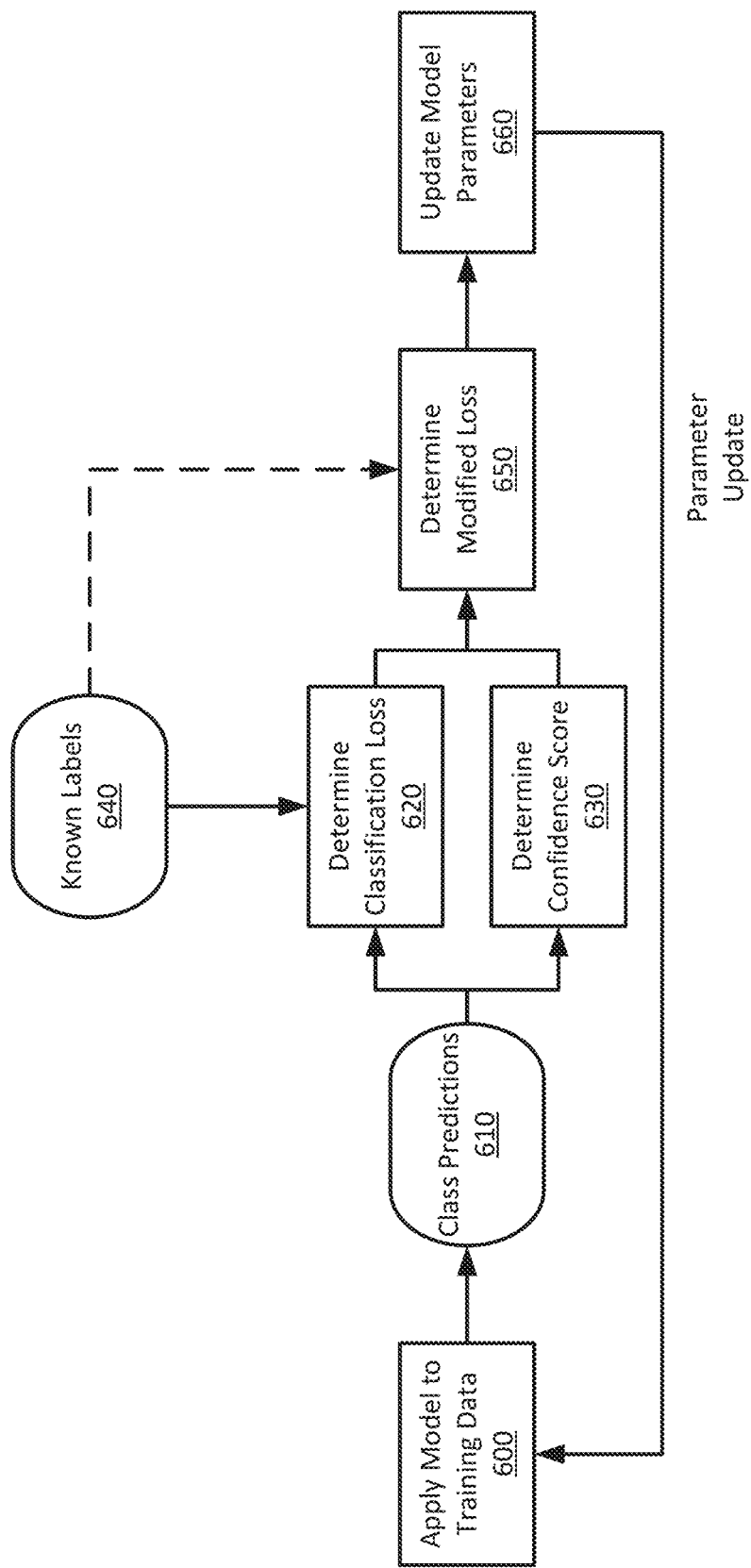
FIG. 6 shows an example flow for using model self-confidence to modify the loss function during training.

FIG. 6 shows an example flow for using model self-confidence to modify the loss function during training. In this example, the confidence score is used as a modifier for a class-based error used to update model parameters. As discussed with respect to FIGS. 1 and 8, the computer model may be trained using a set of training data and by evaluating a loss function (which may also be termed an error or utility function) to update the parameters of the model. During the initial training, as discussed with FIG. 1, the initial training set may be used in the initial training period to initially train the model. During the initial training, the computer model may be evaluated with respect to the error relative to the known class of labeled regions in the data set. For multi-label classification, the loss function may be a cross-entropy error, although any suitable error function may also be used.

Using the confidence scores, the loss function may be modified to increase the weight of low-confidence regions relative to the weight for higher-confidence regions. By modifying the weights, the parameter update (e.g., back-propagation and/or related optimization algorithms for adjusting weights during training iterations) during training is encouraged to increase the relative importance of improving low-confidence classifications. Because the predicted classifications are close in predicted value, the modified loss may encourage the updated parameters to improve classification for 'difficult' classifications, e.g., for pairs of classifications that have similar prediction for the region. In addition, the "difficulty" is automatically determined by the model based on its own unsupervised determination of a confidence score.

As with other training data discussed above, the model is applied 600 to a training space (or a batch of training spaces within a training iteration) to generate a set of class predictions 610 for each region based on the current model parameters. From the set of class predictions 610 generated by applying the model, the training module may determine a classification loss 620 according to a loss function (e.g., a cross-entropy loss). The cross-entropy loss compares the known labels 640 for a region with the class predictions 610.

Using the class predictions 610, a set of confidence scores 630 is determined as discussed above. To apply the confidence scores 630 to the classification loss 620 and determine a modified loss 650, the classification loss 620 for a particular region may be modified based on the lack of confidence of the model. That is, in general, the less confident the model was in its prediction for a region, the higher the classification loss is weighed, increasing the effect of the model parameter updates that affect those values. The confidence score may be applied in various ways; in one example, the classification loss for a region i is modified directly based on the lack of confidence.

In an embodiment in which the classification loss for a region is directly modified, the classification loss (e.g., the cross-entropy loss CE) for the region may both be terms in a loss function L for the training space. In one embodiment, to measure the "lack" of confidence, the lack of confidence is represented as the percentage complement of the percentage score, $(1-f_{conf}[i])$, that in one embodiment may be multiplied by the classification loss CE:

$$L = \frac{1}{N}\sum_{i=0}^{N}(1 - f_{conf}[i]) \, CE(f_{softmax}[i], g[i]) \quad \text{Equation 1}$$

In equation 1, the modified classification loss L for a training space is summed across the N regions of the space. CE is the classification loss based on the predicted classification for the region i and its known label (e.g., ground truth) g[i]. As shown in equation 1, as the function for the confidence score increases, the weight for the classification error of region i decreases.

In a further embodiment, the loss function includes a training modifier γ to transition the classification loss L to smoothly incorporate the confidence-based factor:

$$L = \frac{1}{N}\sum_{i=0}^{N}(1 - f_{conf}[i])^{\gamma} \, CE(f_{softmax}[i], g[i]) \quad \text{Equation 2}$$

Equation 2 is similar to Equation 1, except that it includes the training modifier γ to smooth the transition of the confidence-based term. As the training modifier increases, the effect of the confidence-based term also increases. In one embodiment, the training modifier γ is zero (eliminating the confidence-based term) during the initial training period and increases gradually afterwards, as indicated by Equation 3:

$$\gamma = \begin{cases} 0 & \text{for } 0 \leq t \leq T_0 \\ \min\left(b * \left(\frac{t - T_0}{T_{inv}}\right), 2\right) & \text{for } t \geq T_0 \end{cases} \quad \text{Equation 3}$$

As shown by Equation 3, the transition from the initial training period to the period in which the confidence score is used is denoted $T_0$. In this example, as the current training iteration t increases, the training modifier γ gradually increases, in this example to a maximum of 2. In Equation 3, the training modifier γ increases by a scaling modifier b after every $T_{inv}$ iterations after $T_0$. In various other embodiments, other values than 2 may be set as the maximum value of γ, and may generally be denoted $\gamma_{max}$. In one example embodiment, b is set to 0.05 and $T_{inv}$ is set to 4000 iterations.

In another embodiment for modifying the classification loss 620 with the confidence scores, the regions may be grouped into subsets as discussed above with respect to FIGS. 4-5. That is, regions may be grouped according to the known labels 640 similar to the discussion above with respect to modifying the training space. Rather than modifying the training space, however, the assigned confidence groups for region subsets s are used to modify the classification error for the regions within the subset $s_i$. Equation 4 illustrates the different classification modifiers ($b_{low}$ and $b_{high}$) applied to a region based on whether the region subset belongs to a high-confidence group (HCG) or a low-confidence group (LCG):

$$L = \frac{1}{N}\sum_{i=0}^{N}\begin{cases} b_{low} * CE(f_{softmax}[i], g[i]) & \text{for } s_i \in HCG \\ b_{high} * CE(f_{softmax}[i], g[i]) & \text{for } s_i \in LCG \end{cases} \quad \text{Equation 4}$$

In this example, the classification loss is modified based on the subset to which the region belongs. The high-confidence group is assigned a relatively lower classification modifier, $b_{low}$, while the low-confidence group is assigned a relatively higher classification modifier, $b_{high}$. Thus, a particular region may itself have a high confidence score but be grouped with a region (based on the known label) that is assigned to the low-confidence group. In this example, because the weight for a region may be based on the subsets based on known labels, this may generally boost the weights for classes which are more frequently labeled with low-confidence, enabling those classes to be more effectively learned in the confidence-based error modification. As discussed above, additional embodiments may include more than two confidence group categories. Generally, these principles may apply when regions are grouped according to known labels and assigned a classification modifier based on the group's (e.g., the subset's) collective confidence metric. As such, in one embodiment rather than static classification modifiers, the classification modifier may be determined as a function of the confidence metric of the region subset, such that the classification modifier generally increases when the confidence for the subset decreases.

In addition, the various techniques discussed herein may also be combined and used together in various ways. For example, in some embodiments, the training spaces may be modified based on model confidence, and in addition the classification error may be modified based on the region's confidence as noted above.

Figure 7:
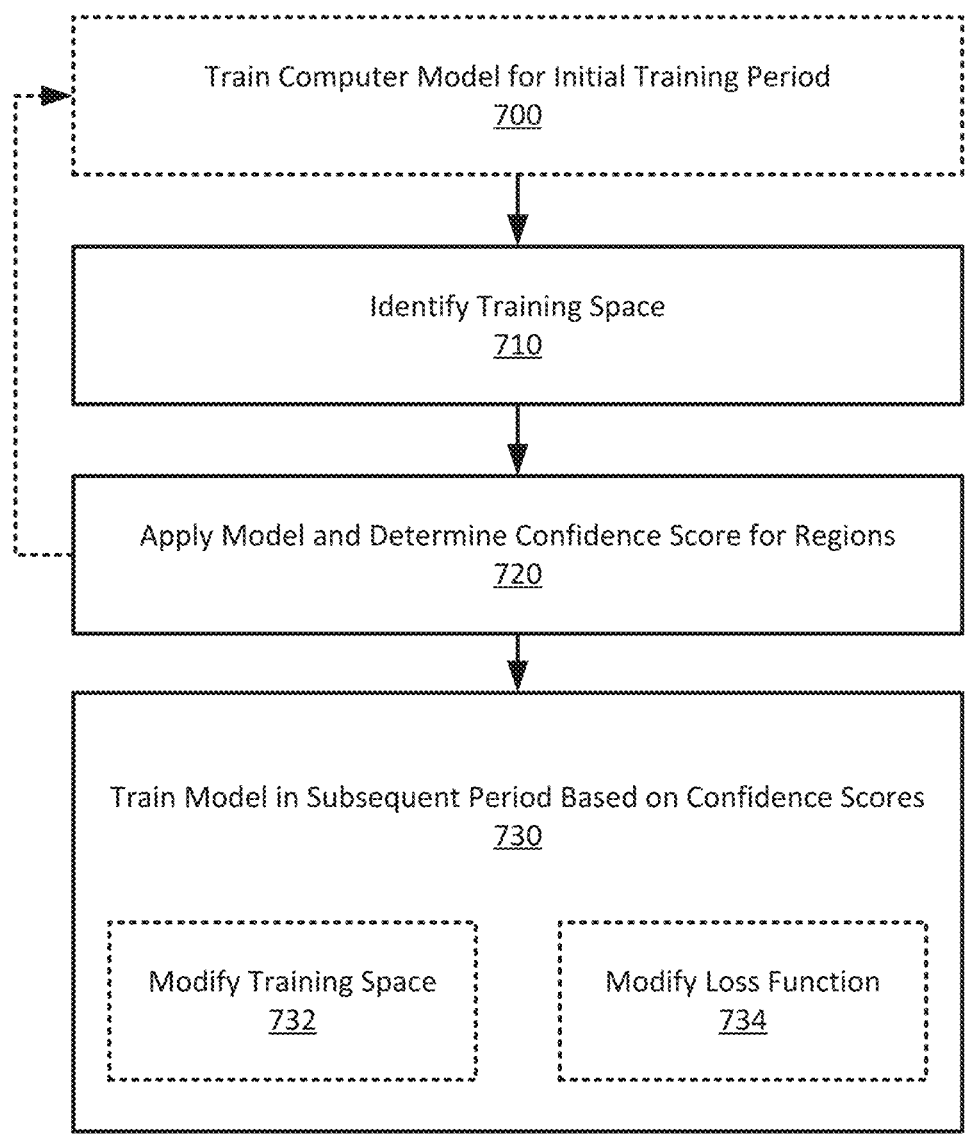
FIG. 7 shows an example flow for training a multi-label classifier using self-confidence according to one embodiment.

FIG. 7 shows an example flow for training a multi-label classifier using self-confidence according to one embodiment. As shown in FIG. 7, the computer model may be initially trained 700 during an initial training period to initialize the class predictions to be further refined based on the model's confidence. To further train the model, a training space including regions is identified 710 and the model is applied to the regions to determine class predictions and a respective confidence score for each region. Using the confidence scores, the model may be further trained a subsequent period based on the confidence scores as discussed in detail above. As two examples, a training space may be modified 732 to include low-confidence region subsets and may exclude high-confidence region subsets from the modified training space, such that the modified training space may emphasize further training in areas of low confidence. Similarly, the model may be further trained 730 by modifying a training loss function 734 based on the confidence scores. As discussed above, the loss function may be modified by modifying a per-region error according to the region's confidence score, while in another example the loss function may be modified by setting a modifier based on a confidence determined for a group of regions, such as the regions of a particular class.

Example Computer Modeling

Figure 8:
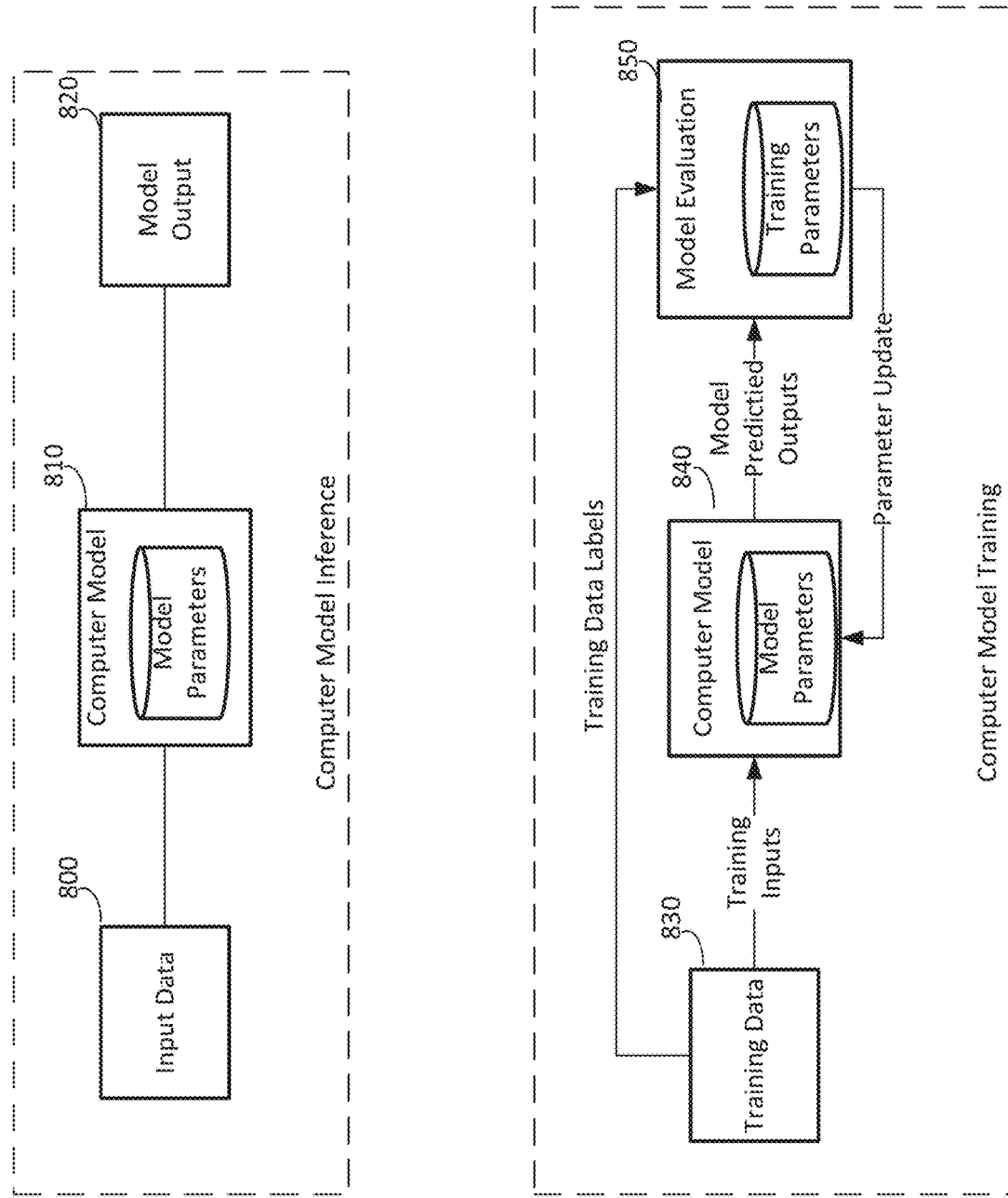
FIG. 8 shows example computer model inference and computer model training.

FIG. 8 shows example computer model inference and computer model training. Computer model inference refers to the application of a computer model 810 to a set of input data 800 to generate an output or model output 820. The computer model 810 determines the model output 820 based on parameters of the model, also referred to as model parameters. The parameters of the model may be determined based on a training process that finds an optimization of the model parameters, typically using training data and desired outputs of the model for the respective training data as discussed below. The output of the computer model may be referred to as an "inference" because it is a predictive value based on the input data 800 and based on previous example data used in the model training.

The input data 800 and the model output 820 vary according to the particular use case. For example, for computer vision and image analysis, the input data XA00 may be an image having a particular resolution, such as 75×75 pixels, or a point cloud describing a volume. In other applications, the input data 800 may include a vector, such as a sparse vector, representing information about an object. For example, in recommendation systems, such a vector may represent user-object interactions, such that the sparse vector indicates individual items positively rated by a user. In addition, the input data 800 may be a processed version of another type of input object, for example representing various features of the input object or representing preprocessing of the input object before input of the object to the computer model 810. As one example, a 1024×1024 resolution image may be processed and subdivided into individual image portions of 64×64, which are the input data 800 processed by the computer model 810. As another example, the input object, such as a sparse vector discussed above, may be processed to determine an embeddings or another compact representation of the input object that may be used to represent the object as the input data 800 in the computer model 810. Such additional processing for input objects may themselves be learned representations of data, such that another computer model processes the input objects to generate an output that is used as the input data 800 for the computer model 810. Although not further discussed here, such further computer models may be independently or jointly trained with the computer model 810.

As noted above, the model output 820 may depend on the particular application of the computer model 810, and represent recommendation systems, computer vision systems, classification systems, labeling systems, weather prediction, autonomous control, and any other type of modeling output/prediction.

The computer model 810 includes various model parameters, as noted above, that describe the characteristics and functions that generate the model output 820 from the input data 800. In particular, the model parameters may include a model structure, model weights, and a model execution environment. The model structure may include, for example, the particular type of computer model 810 and its structure and organization. For example, the model structure may designate a neural network, which may be comprised of multiple layers, and the model parameters may describe individual types of layers included in the neural network and the connections between layers (e.g., the output of which layers constitute inputs to which other layers). Such networks may include, for example, feature extraction layers, convolutional layers, pooling/dimensional reduction layers, activation layers, output/predictive layers, and so forth. While in some instances the model structure may be determined by a designer of the computer model, in other examples, the model structure itself may be learned via a training process and may thus form certain "model parameters" of the model.

The model weights may represent the values with which the computer model 810 processes the input data 800 to the model output 820. Each portion or layer of the computer model 810 may have such weights. For example, weights may be used to determine values for processing inputs to determine outputs at a particular portion of a model. Stated another way, for example, model weights may describe how to combine or manipulate values of the input data 800 or thresholds for determining activations as output for a model. As one example, a convolutional layer typically includes a set of convolutional "weights," also termed a convolutional kernel, to be applied to a set of inputs to that layer. These are subsequently combined, typically along with a "bias" parameter, and weights for other transformations to generate an output for the convolutional layer.

The model execution parameters represent parameters describing the execution conditions for the model. In particular, aspects of the model may be implemented on various types of hardware or circuitry for executing the computer model. For example, portions of the model may be implemented in various types of circuitry, such as general-purpose circuitry (e.g., a general CPU), circuitry specialized for certain computer model functions (e.g., a GPU or programmable Multiply-and-Accumulate circuit) or circuitry specially designed for the particular computer model application. In some configurations, different portions of the computer model 810 may be implemented on different types of circuitry. As discussed below, training of the model may include optimizing the types of hardware used for certain aspects of the computer model (e.g., co-trained), or may be determined after other parameters for the computer model are determined without regard to configuration executing the model. In another example, the execution parameters may also determine or limit the types of processes or functions available at different portions of the model, such as value ranges available at certain points in the processes, operations available for performing a task, and so forth.

Computer model training may thus be used to determine or "train" the values of the model parameters for the computer model 840. During training, the model parameters are optimized to "learn" values of the model parameters (such as individual weights, activation values, model execution, etc.), that improve the model parameters based on an optimization function that seeks to improve a cost function (also sometimes termed a loss function). Before training, the computer model 840 has model parameters that have initial values that may be selected in various ways, such as by a randomized initialization, initial values selected based on other or similar computer models, or by other means. During training, the model parameters are modified based on the optimization function to improve the cost/loss function relative to the prior model parameters.

In many applications, training data 830 includes a data set to be used for training the computer model 840. The data set varies according to the particular application and purpose of the computer model 840. In supervised learning tasks, the training data typically includes a set of training data labels that describe the training data and the desired output of the model relative to the training data. For example, for an object classification task, the training data may include individual images in which individual portions, regions or pixels in the image are labeled with the classification of the object. For this task, the training data may include a training data image depicting a dog and a person and a training data labels that label the regions of the image that include the dog and the person, such that the computer model is intended to learn to also label the same portions of that image as a dog and a person, respectively.

To train the computer model, a training module (not shown) applies the training inputs 830 to the computer model 840 to determine the outputs predicted by the model for the given training inputs 830. The training module, though not shown, is a computing module used for performing the training of the computer model by executing the computer model according to its inputs and outputs given the model's parameters and modifying the model parameters based on the results. The training module may apply the actual execution environment of the computer model 840, or may simulate the results of the execution environment, for example to estimate the performance, runtime, memory, or circuit area (e.g., if specialized hardware is used) of the computer model. The training module, along with the training data and model evaluation, may be instantiated in software and/or hardware by one or more processing devices such as the example computing device 1000 shown in FIG. 10. In various examples, the training process may also be performed by multiple computing systems in conjunction with one another, such as distributed/cloud computing systems.

After processing the training inputs according to the current model parameters for the computer model 840, the model's predicted outputs are evaluated 850 and the computer model is evaluated with respect to the cost function and optimized using an optimization function of the training model. Depending on the optimization function, particular training process and training parameters after the model evaluation are updated to improve the optimization function of the computer model. In supervised training (i.e., training data labels are available), the cost function may evaluate the model's predicted outputs relative to the training data labels and to evaluate the relative cost or loss of the prediction relative to the "known" labels for the data. This provides a measure of the frequency of correct predictions by the computer model and may be measured in various ways, such as the precision (frequency of false positives) and recall (frequency of false negatives). The cost function in some circumstances may evaluate may also evaluate other characteristics of the model, for example the model complexity, processing speed, memory requirements, physical circuit characteristics (e.g., power requirements, circuit throughput) and other characteristics of the computer model structure and execution environment (e.g., to evaluate or modify these model parameters).

After determining results of the cost function, the optimization function determines a modification of the model parameters to improve the cost function for the training data. Many such optimization functions are known to one skilled on the art. Many such approaches differentiate the cost function with respect to the parameters of the model and determine modifications to the model parameters that thus improves the cost function. The parameters for the optimization function, including algorithms for modifying the model parameters are the training parameters for the optimization function. For example, the optimization algorithm may use gradient descent (or its variants), momentum-based optimization, or other optimization approaches used in the art and as appropriate for the particular use of the model. The optimization algorithm thus determines the parameter updates to the model parameters. In some implementations, the training data is batched and the parameter updates are iteratively applied to batches of the training data. For example, the model parameters may be initialized, then applied to a first batch of data to determine a first modification to the model parameters. The second batch of data may then be evaluated with the modified model parameters to determine a second modification to the model parameters, and so forth, until a stopping point, typically based on either the amount of training data available or the incremental improvements in model parameters are below a threshold (e.g., additional training data no longer continues to improve the model parameters). Additional training parameters may describe the batch size for the training data, a portion of training data to use as validation data, the step size of parameter updates, a learning rate of the model, and so forth. Additional techniques may also be used to determine global optimums or address nondifferentiable model parameter spaces.

Figure 9:
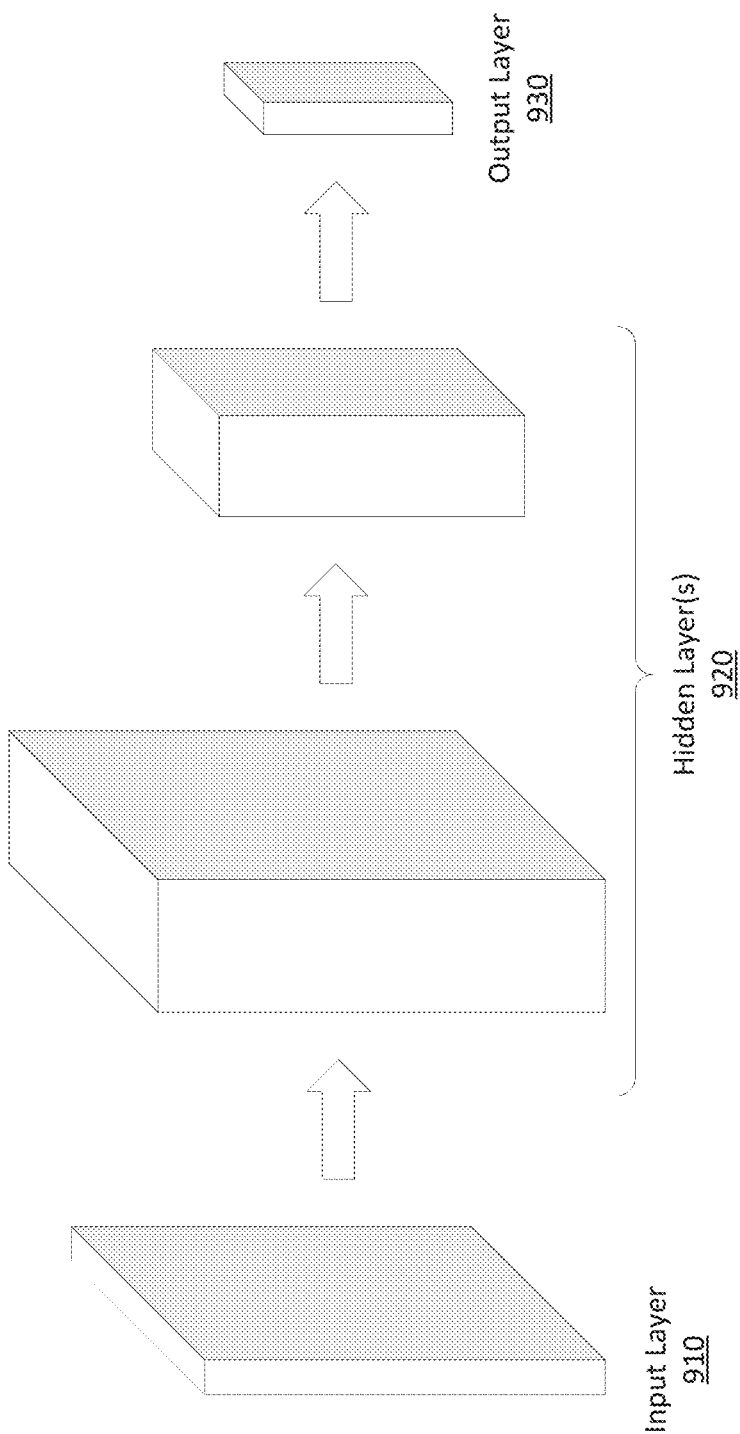
FIG. 9 illustrates an example neural network architecture.

FIG. 9 illustrates an example neural network architecture. In general, a neural network includes an input layer 910, one or more hidden layers 920, and an output layer 930. The values for data in each layer of the network is generally determined based on one or more prior layers of the network. Each layer of a network generates a set of values, termed "activations" that represent the output values of that layer of a network and may be the input to the next layer of the network. For the input layer 910, the activations are typically the values of the input data, although the input layer 910 may represent input data as modified through one or more transformations to generate representations of the input data. For example, in recommendation systems, interactions between users and objects may be represented as a sparse matrix. Individual users or objects may then be represented as an input layer 910 as a transformation of the data in the sparse matrix relevant to that user or object. The neural network may also receive the output of another computer model (or several), as its input layer 910, such that the input layer 910 of the neural network shown in FIG. 9 is the output of another computer model. Accordingly, each layer may receive a set of inputs, also termed "input activations," representing activations of one or more prior layers of the network and generate a set of outputs, also termed "output activations" representing the activation of that layer of the network. Stated another way, one layer's output activations become the input activations of another layer of the network (except for the final output layer of 930 of the network.

Each layer of the neural network typically represents its output activations (i.e., also termed its outputs) in a matrix, which may be 1, 2, 3, or n-dimensional according to the particular structure of the network. As shown in FIG. 9, the dimensionality of each layer may differ according to the design of each layer. The dimensionality of the output layer 930 depend on the characteristics of the prediction made by the model. For example, a computer model for multi-object classification may generate an output layer 930 having a one-dimensional array in which each position in the array represents the likelihood of a different classification for the input layer 910. In another example for classification of portions of an image, the input layer 910 may be an image having a resolution, such as 512×512, and the output layer may be a 512×512×n matrix in which the output layer 930 provides n classification predictions for each of the input pixels, such that the corresponding position of each pixel in the input layer 910 in the output layer 930 is an n-dimensional array corresponding to the classification predictions for that pixel.

The hidden layers 920 provide output activations that variously characterize the input layer 910 in various ways that assist in effectively generating the output layer 930. The hidden layers thus may be considered to provide additional features or characteristics of the input layer 910. Though two hidden layers are shown in FIG. 9, in practice any number of hidden layers may be provided in various neural network structures.

Each layer generally determines the output activation values of positions in its activation matrix based on the output activations of one or more previous layers of the neural network (which may be considered input activations to the layer being evaluated). Each layer applies a function to the input activations to generate its activations. Such layers may include fully-connected layers (e.g., every input is connected to every output of a layer), convolutional layers, deconvolutional layers, pooling layers, and recurrent layers. Various types of functions may be applied by a layer, including linear combinations, convolutional kernels, activation functions, pooling, and so forth. The parameters of a layer's function are used to determine output activations for a layer from the layer's activation inputs and are typically modified during the model training process. The parameters describing the contribution of a particular portion of a prior layer is typically termed a weight. For example, in some layers, the function is a multiplication of each input with a respective weight to determine the activations for that layer. For a neural network, the parameters for the model as a whole thus may include the parameters for each of the individual layers and in large-scale networks can include hundreds of thousands, millions, or more of different parameters.

As one example for training a neural network, the cost function is evaluated at the output layer 930. To determine modifications of the parameters for each layer, the parameters of each prior layer may be evaluated to determine respective modifications. In one example, the cost function (or "error") is backpropagated such that the parameters are evaluated by the optimization algorithm for each layer in sequence, until the input layer 910 is reached.

Example Devices

Figure 10:
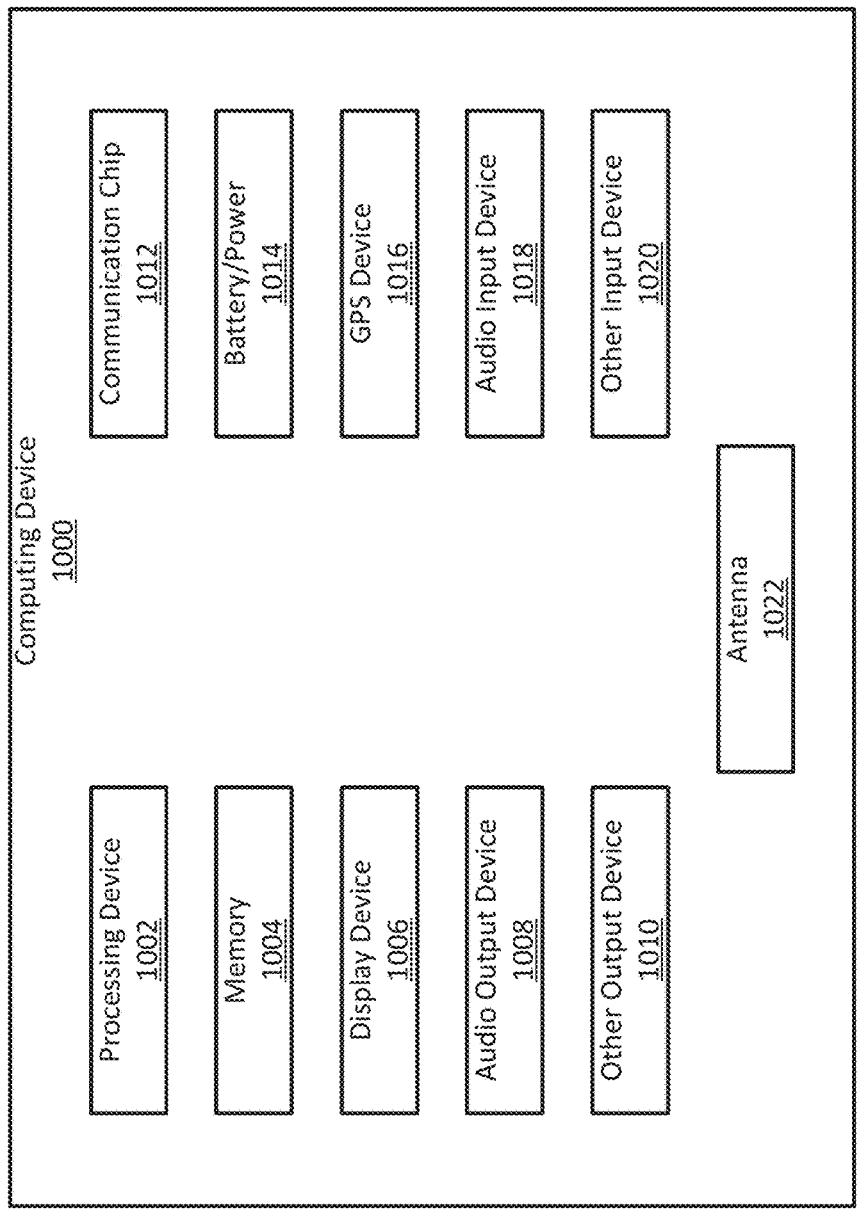
FIG. 10 is a block diagram of an example computing device 1000 that may include one or more components used for training, analyzing, or implementing a computer model in accordance with any of the embodiments disclosed herein.

FIG. 10 is a block diagram of an example computing device 1000 that may include one or more components used for training, analyzing, or implementing a computer model in accordance with any of the embodiments disclosed herein. For example, the computing device 1000 may include a training module for training a computer model and may include a trained computer model for executing functions of the computing device 1000, and in some circumstances may include specialized hardware and/or software for executing the computer model.

A number of components are illustrated in FIG. 10 as included in the computing device 1000, but any one or more of these components may be omitted or duplicated, as suitable for the application. In some embodiments, some or all of the components included in the computing device 1000 may be attached to one or more motherboards. In some embodiments, some or all of these components are fabricated onto a single system-on-a-chip (SoC) die.

Additionally, in various embodiments, the computing device 1000 may not include one or more of the components illustrated in FIG. 10, but the computing device 1000 may include interface circuitry for coupling to the one or more components. For example, the computing device 1000 may not include a display device 1006, but may include display device interface circuitry (e.g., a connector and driver circuitry) to which a display device 1006 may be coupled. In another set of examples, the computing device 1000 may not include an audio input device 1024 or an audio output device 1008 but may include audio input or output device interface circuitry (e.g., connectors and supporting circuitry) to which an audio input device 1024 or audio output device 1008 may be coupled.

The computing device 1000 may include a processing device 1002 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 1000 may include a memory 1004, which may itself include one or more memory devices such as volatile memory (e.g., dynamic random-access memory (DRAM)), nonvolatile memory (e.g., read-only memory (ROM)), flash memory, solid state memory, and/or a hard drive. The memory 1104 may include instructions executable by the processing device for performing methods and functions as discussed herein. Such instructions may be instantiated in various types of memory, which may include non-volatile memory and as stored on one or more non-transitory mediums. In some embodiments, the memory 1004 may include memory that shares a die with the processing device 1002. This memory may be used as cache memory and may include embedded dynamic random-access memory (eDRAM) or spin transfer torque magnetic random-access memory (STT-MRAM).

In some embodiments, the computing device 1000 may include a communication chip 1012 (e.g., one or more communication chips). For example, the communication chip 1012 may be configured for managing wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1012 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1012 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 1012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1012 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1012 may operate in accordance with other wireless protocols in other embodiments. The computing device 1000 may include an antenna 1022 to facilitate wireless communications and/or to receive other wireless communications (such as AM or FM radio transmissions).

In some embodiments, the communication chip 1012 may manage wired communications, such as electrical, optical, or any other suitable communication protocols (e.g., the Ethernet). As noted above, the communication chip 1012 may include multiple communication chips. For instance, a first communication chip 1012 may be dedicated to shorter-range wireless communications such as Wi-Fi or Bluetooth, and a second communication chip 1012 may be dedicated to longer-range wireless communications such as global positioning system (GPS), EDGE, GPRS, CDMA, WiMAX, LTE, EV-DO, or others. In some embodiments, a first communication chip 1012 may be dedicated to wireless communications, and a second communication chip 1012 may be dedicated to wired communications.

The computing device 1000 may include battery/power circuitry 1014. The battery/power circuitry 1014 may include one or more energy storage devices (e.g., batteries or capacitors) and/or circuitry for coupling components of the computing device 1000 to an energy source separate from the computing device 1000 (e.g., AC line power).

The computing device 1000 may include a display device 1006 (or corresponding interface circuitry, as discussed above). The display device 1006 may include any visual indicators, such as a heads-up display, a computer monitor, a projector, a touchscreen display, a liquid crystal display (LCD), a light-emitting diode display, or a flat panel display, for example.

The computing device 1000 may include an audio output device 1008 (or corresponding interface circuitry, as discussed above). The audio output device 1008 may include any device that generates an audible indicator, such as speakers, headsets, or earbuds, for example.

The computing device 1000 may include an audio input device 1024 (or corresponding interface circuitry, as discussed above). The audio input device 1024 may include any device that generates a signal representative of a sound, such as microphones, microphone arrays, or digital instruments (e.g., instruments having a musical instrument digital interface (MIDI) output).

The computing device 1000 may include a GPS device 1018 (or corresponding interface circuitry, as discussed above). The GPS device 1018 may be in communication with a satellite-based system and may receive a location of the computing device 1000, as known in the art.

The computing device 1000 may include an other output device 1010 (or corresponding interface circuitry, as discussed above). Examples of the other output device 1010 may include an audio codec, a video codec, a printer, a wired or wireless transmitter for providing information to other devices, or an additional storage device.

The computing device 1000 may include an other input device 1020 (or corresponding interface circuitry, as discussed above). Examples of the other input device 1020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1000 may have any desired form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 1000 may be any other electronic device that processes data.

SELECT EXAMPLES

The following paragraphs provide various examples of the embodiments disclosed herein.

Example 1 provides a method including training a computer model for an initial training period with an initial training set, the computer model trained to predict, for a region (e.g., a point, pixel, or voxel) of a space (e.g., a 2- or 3-domensional space, such as an image or a pointcloud), a plurality of class predictions; identifying a training space having a plurality of regions; for each region in the plurality of regions, applying the computer model to the region to generate a plurality of class predictions; and determining a confidence score for the region based on the plurality of class predictions for the region; and training the computer model for a further training period based on the confidence scores for the plurality of regions.

Example 2 provides for the method of example 1, wherein the region is a pixel or a voxel.

Example 3 provides for the method of any of examples 1-2, wherein the region confidence score is determined by a difference between a highest class prediction and a second-highest class prediction.

Example 4 provides for the method of any of examples 1-3, wherein the class predictions are generated by a softmax function.

Example 5 provides for the method of any of examples 1-4, wherein the class predictions are a probability.

Example 6 provides for the method of any of examples 1-5, wherein training the computer model for another training period includes: grouping the plurality of regions into region subsets corresponding to known classifications for the plurality of regions; for each region subset, determining a ratio describing a proportion of the subset having a confidence score below a threshold; generating a modified space from the space by comparing the ratio for each region subset with a threshold and removing the region subset from the modified space when the ratio is below the threshold; and training the computer model for another training period with another training set that includes the modified space.

Example 7 provides for the method of example 6, wherein the other training set includes a set of spaces selected from modified spaces and spaces from the initial training set.

Example 8 provides for the method of any of examples 6-7, wherein each region subset included in the modified space includes padding around the region subset.

Example 9 provides for the method of example 1, wherein training the computer model for another training period includes: grouping the plurality of regions into region subsets corresponding to known classifications for the plurality of regions; for each region subset, determining a ratio describing a proportion of the subset having a confidence score below a threshold; determining a confidence modifier of each region based on the ratio of the region subset associated with the region; and training the computer model for another training period with an additional training set that includes the training space, the training including modifying a classification loss of each region in the training space with the confidence modifier for the region.

Example 10 provides for the method of example 9, wherein the confidence modifier is set to a high-confidence value or a low-confidence value.

Example 11 provides for the method of example 10, wherein the high-confidence value reduces the effect of the classification loss for the region relative to the low-confidence value.

Example 12 provides for the method of any of examples 9-11, further includes assigning each region subset to a high-confidence group or a low-confidence group; wherein the confidence modifier for each region is based on whether the region is grouped with a subset assigned to the high-confidence group or the low-confidence group.

Example 13 provides for the method of example 1, wherein training the computer model for the further training period includes: training the computer model for another training period with an additional training set that includes the training space, the training including modifying a classification loss of each region in the training space based on the confidence score for the region.

Example 14 provides for the method of example 13 wherein modifying the classification loss decreases the classification loss more when the confidence score for the region is high relative to when the confidence score for the region is low.

Example 15 provides for the method of 13 wherein the modified classification loss is defined by $$L = \frac{1}{N}\sum_{i=0}^{N}(1 - f_{conf}[i]) \; CE(f_{softmax}[i], g[i])$$

where L is the modified classification loss across each region i, N is the number of regions in the space, $f_{conf}$ is a function for the confidence score, and CE is the classification loss in which g[i] is the known label for region i.

Example 16 provides for the method of any of examples 13-15 wherein the confidence score is applied as a function of the number of training iterations.

Example 17 provides for the method of example 13, wherein the modified classification loss is defined by:

$$L = \frac{1}{N}\sum_{i=0}^{N}(1 - f_{conf}[i])^{\gamma} \; CE(f_{softmax}[i], g[i])$$

where L is the modified classification loss across each region i, N is the number of regions in the space, $f_{conf}$ is a function for the confidence score, CE is a cross-entropy classification loss in which g[i] is the known label for region i, and γ is a training modifier based on the number of training iterations.

Example 18 provides for the method of example 17, wherein the training modifier γ is defined by:

$$\gamma = \begin{cases} 0 & \text{for } 0 \leq t \leq T_0 \\ \min\left(b * \left(\frac{t - T_0}{T_{inv}}\right), \gamma_{max}\right) & \text{for } t \geq T_0 \end{cases}$$

where b is a scaling modifier, t is a current training iteration, $T_0$ is the initial training period, and $T_{inv}$ is a number of iterations for which to increase the training modifier γ by the scaling modifier b to a maximum of $\gamma_{max}$.

Example 19 provides for a system including: a processor; and a non-transitory computer-readable storage medium containing computer program code for execution by the processor for: training a computer model for an initial training period with an initial training set, the computer model trained to predict, for a region of a space, a plurality of class predictions; identifying a training space having a plurality of regions; for each region in the plurality of regions, applying the computer model to the region to generate a plurality of class predictions; and determining a confidence score for the region based on the plurality of class predictions for the region; and training the computer model for a further training period based on the confidence scores for the plurality of regions.

Example 20 provides for the system of example 19, wherein the region is a pixel or a voxel.

Example 21 provides for the system of any of examples 19-20, wherein the region confidence score is determined by a difference between a highest class prediction and a second-highest class prediction.

Example 22 provides for the system of any of examples 19-21, wherein the class predictions are generated by a softmax function.

Example 23 provides for the system of any of examples 19-22, wherein the class predictions are a probability.

Example 24 provides for the system of any of examples 19-23, wherein training the computer model for another training period includes: grouping the plurality of regions into region subsets corresponding to known classifications for the plurality of regions; for each region subset, determining a ratio describing a proportion of the subset having a confidence score below a threshold; generating a modified space from the space by comparing the ratio for each region subset with a threshold and removing the region subset from the modified space when the ratio is below the threshold; and training the computer model for another training period with another training set that includes the modified space.

Example 25 provides for the system of example 24, wherein the other training set includes a set of spaces selected from modified spaces and spaces from the initial training set.

Example 26 provides for the system of any of examples 24-25, wherein each region subset included in the modified space includes padding around the region subset.

Example 27 provides for the system of example 19, wherein training the computer model for another training period includes: grouping the plurality of regions into region subsets corresponding to known classifications for the plurality of regions; for each region subset, determining a ratio describing a proportion of the subset having a confidence score below a threshold; determining a confidence modifier of each region based on the ratio of the region subset associated with the region; and training the computer model for another training period with an additional training set that includes the training space, the training including modifying a classification loss of each region in the training space with the confidence modifier for the region.

Example 28 provides for the system of example 27, wherein the confidence modifier is set to a high-confidence value or a low-confidence value.

Example 29 provides for the system of example 28, wherein the high-confidence value reduces the effect of the classification loss for the region relative to the low-confidence value.

Example 30 provides for the system of example 27-29, wherein the computer program code is further for: assigning each region subset to a high-confidence group or a low-confidence group; wherein the confidence modifier for each region is based on whether the region is grouped with a subset assigned to the high-confidence group or the low-confidence group.

Example 31 provides for the system of example 19, wherein training the computer model for the further training period includes: training the computer model for another training period with an additional training set that includes the training space, the training including modifying a classification loss of each region in the training space based on the confidence score for the region.

Example 32 provides for the system of example 31 wherein modifying the classification loss decreases the classification loss more when the confidence score for the region is high relative to when the confidence score for the region is low.

Example 33 provides for the system of 31 wherein the modified classification loss is defined by:

$$L = \frac{1}{N}\sum_{i=0}^{N}(1 - f_{conf}[i])\ CE(f_{softmax}[i], g[i])$$

where L is the modified classification loss across each region i, N is the number of regions in the space, $f_{conf}$ is a function for the confidence score, and CE is the classification loss in which g[i] is the known label for region i.

Example 34 provides for the system of any of examples 31-33 wherein the confidence score is applied as a function of the number of training iterations.

Example 35 provides for the system of example 31, wherein the modified classification loss is defined by:

$$L = \frac{1}{N}\sum_{i=0}^{N}(1 - f_{conf}[i])^{\gamma}\ CE(f_{softmax}[i], g[i])$$

where L is the modified classification loss across each region i, N is the number of regions in the space, $f_{conf}$ is a function for the confidence score, CE is a cross-entropy classification loss in which g[i] is the known label for region i, and γ is a training modifier based on the number of training iterations.

Example 36 provides for the system of example 19, wherein the training modifier γ is defined by:

$$\gamma = \begin{cases} 0 & \text{for } 0 \le t \le T_0 \\ \min\left(b*\left(\frac{t - T_0}{T_{inv}}\right), \gamma_{max}\right) & \text{for } t \ge T_0 \end{cases}$$

where b is a scaling modifier, t is a current training iteration, $T_0$ is the initial training period, and $T_{inv}$ is a number of iterations for which to increase the training modifier γ by the scaling modifier b to a maximum of $\gamma_{max}$.

Example 37 provides for a non-transitory computer-readable storage medium containing instructions executable by a processor for: training a computer model for an initial training period with an initial training set, the computer model trained to predict, for a region of a space, a plurality of class predictions; identifying a training space having a plurality of regions; for each region in the plurality of regions, applying the computer model to the region to generate a plurality of class predictions; and determining a confidence score for the region based on the plurality of class predictions for the region; and training the computer model for a further training period based on the confidence scores for the plurality of regions.

Example 38 provides for the non-transitory computer-readable storage medium of example 37, wherein the region is a pixel or a voxel.

Example 39 provides for the non-transitory computer-readable storage medium of any of examples 37-38, wherein the region confidence score is determined by a difference between a highest class prediction and a second-highest class prediction.

Example 40 provides for the non-transitory computer-readable storage medium of any of examples 37-39, wherein the class predictions are generated by a softmax function.

Example 41 provides for the non-transitory computer-readable storage medium of any of examples 37-40, wherein the class predictions are a probability.

Example 42 provides for the non-transitory computer-readable storage medium of any of example 37-41, wherein training the computer model for another training period includes: grouping the plurality of regions into region subsets corresponding to known classifications for the plurality of regions; for each region subset, determining a ratio describing a proportion of the subset having a confidence score below a threshold; generating a modified space from the space by comparing the ratio for each region subset with a threshold and removing the region subset from the modified space when the ratio is below the threshold; and training the computer model for another training period with another training set that includes the modified space.

Example 43 provides for the non-transitory computer-readable storage medium of example 42, wherein the other training set includes a set of spaces selected from modified spaces and spaces from the initial training set.

Example 44 provides for the non-transitory computer-readable storage medium of any of examples 42-43, wherein each region subset included in the modified space includes padding around the region subset.

Example 45 provides for the non-transitory computer-readable storage medium of example 37, wherein training the computer model for another training period includes: grouping the plurality of regions into region subsets corresponding to known classifications for the plurality of regions; for each region subset, determining a ratio describing a proportion of the subset having a confidence score below a threshold; determining a confidence modifier of each region based on the ratio of the region subset associated with the region; and training the computer model for another training period with an additional training set that includes the training space, the training including modifying a classification loss of each region in the training space with the confidence modifier for the region.

Example 46 provides for the non-transitory computer-readable storage medium of example 45, wherein the confidence modifier is set to a high-confidence value or a low-confidence value.

Example 47 provides for the non-transitory computer-readable storage medium of example 46, wherein the high-confidence value reduces the effect of the classification loss for the region relative to the low-confidence value.

Example 48 provides for the non-transitory computer-readable storage medium of example 45-47, wherein the computer program code is further for: assigning each region subset to a high-confidence group or a low-confidence group; wherein the confidence modifier for each region is based on whether the region is grouped with a subset assigned to the high-confidence group or the low-confidence group.

Example 49 provides for the non-transitory computer-readable storage medium of example 37, wherein training the computer model for the further training period includes: training the computer model for another training period with an additional training set that includes the training space, the training including modifying a classification loss of each region in the training space based on the confidence score for the region.

Example 50 provides for the non-transitory computer-readable storage medium of example 49 wherein modifying the classification loss decreases the classification loss more when the confidence score for the region is high relative to when the confidence score for the region is low.

Example 51 provides for the non-transitory computer-readable storage medium of example 49 wherein the modified classification loss is defined by:

$$L = \frac{1}{N}\sum_{i=0}^{N}(1 - f_{conf}[i])\ CE(f_{softmax}[i], g[i])$$

where L is the modified classification loss across each region i, N is the number of regions in the space, $f_{conf}$ is a function for the confidence score, and CE is the classification loss in which g[i] is the known label for region i.

Example 52 provides for the non-transitory computer-readable storage medium of any of examples 49-51 wherein the confidence score is applied as a function of the number of training iterations.

Example 53 provides for the non-transitory computer-readable storage medium of example 49, wherein the modified classification loss is defined by:

$$L = \frac{1}{N}\sum_{i=0}^{N}(1 - f_{conf}[i])^{\gamma}\ CE(f_{softmax}[i], g[i])$$

where L is the modified classification loss across each region i, N is the number of regions in the space, $f_{conf}$ is a function for the confidence score, CE is a cross-entropy classification loss in which g[i] is the known label for region i, and $\gamma$ is a training modifier based on the number of training iterations.

Example 54 provides for the non-transitory computer-readable storage medium of example 37, wherein the training modifier $\gamma$ is defined by:

$$\gamma = \begin{cases} 0 & \text{for } 0 \leq t \leq T_0 \\ \min\left(b*\left(\frac{t - T_0}{T_{inv}}\right), \gamma_{max}\right) & \text{for } t \geq T_0 \end{cases}$$

where b is a scaling modifier, t is a current training iteration, $T_0$ is the initial training period, and $T_{inv}$ is a number of iterations for which to increase the training modifier $\gamma$ by the scaling modifier b to a maximum of $\gamma_{max}$.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

What is claimed is:

1. A method for training a machine learning model, the method comprising:
   training the machine learning model for a first training period with a first training set, the machine learning model trained to receive spaces in images as inputs and to output a plurality of class predictions for the spaces in the images, wherein a space is at least part of one or more images;
   identifying a training space having a plurality of regions, wherein a region is a portion of an image;
   for each region in the plurality of regions of the training space,
      applying the machine learning model to the region to generate one or more class predictions, and
      determining a confidence score for the region based on the one or more class predictions for the region, the confidence score indicating a confidence of the machine learning model on the one or more class predictions; and
   further training, based on the confidence score for each region in the plurality of regions, the machine learning model for a second training period,
   wherein the second training period is after the first training period, and further training the machine learning model comprises:
      generating a modified classification loss by modifying a classification loss of each region in the training space based on the confidence score for each region, and
      using the modified classification loss to determine one or more values of one or more parameters of the machine learning model.

2. The method of claim 1, wherein further training the machine learning model for the second training period comprises:

grouping the plurality of regions into region subsets corresponding to known classifications for the plurality of regions;

for each region subset, determining a ratio describing a proportion of the subset having a confidence score below a threshold;

generating a modified space from the space by comparing the ratio for each region subset with a threshold and removing the region subset from the modified space when the ratio is below the threshold;

forming a second training set that comprises the modified space; and further training the machine learning model for the second training period with the second training set.

3. The method of claim 2, wherein each region subset included in the modified space includes padding around the region subset.

4. The method of claim 1, wherein further training the machine learning model for the second training period comprises:

grouping the plurality of regions into region subsets corresponding to known classifications for the plurality of regions;

for each region subset, determining a ratio describing a proportion of the subset having a confidence score below a threshold; and determining a confidence modifier of each region based on the ratio of the region subset associated with the region, wherein modifying the classification loss of each region in the training space comprises modifying the classification loss of each region in the training space with the confidence modifier for the region.

5. The method of claim 4, further comprising: assigning each region subset to a high-confidence group or a low-confidence group, wherein the confidence modifier for each region is determined based on whether the region is grouped with a subset assigned to the high-confidence group or the low-confidence group.

6. The method of claim 5, wherein the modified classification loss is $$L = \frac{1}{N} \sum_{i=0}^{N} \begin{cases} b_{low} * CE(f_{softmax}[i], g[i]) & \text{for } s_i \in HCG \\ b_{high} * CE(f_{softmax}[i], g[i]) & \text{for } s_i \in LCG \end{cases}$$

wherein L is the modified classification loss across each region i,

N is the number of regions in the space,

CE is a cross-entropy classification loss in which g[i] is the known label for region i, $s_i$ is the region subset of a region, belonging to the high-confidence group (HCG) or the low-confidence group (LCG), $b_{low}$ is the confidence modifier for the high-confidence group and $b_{high}$ is the confidence modifier for the low-confidence group.

7. The method of claim 1, wherein the modified classification loss is $$L = \frac{1}{N} \sum_{i=0}^{N} (1 - f_{conf}[i]) \, CE(f_{softmax}[i], g[i])$$

where L is the modified classification loss across each region i,

N is the number of regions in the space, $f_{conf}$ is a function for the confidence score, and CE is the classification loss in which g[i] is the known label for region i.

8. The method of claim 7, wherein the $(1-f_{conf}[i])$ factor includes a training modifier λ based on a number of training iterations.

9. The method of claim 1, wherein modifying the classification loss of each region in the training space based on the confidence score for each region comprises:

determining that a confidence score of a region in the training space is below a threshold; and increasing a weight for a classification loss of the region.

10. The method of claim 1, wherein modifying the classification loss of each region in the training space based on the confidence score for each region comprises:

determining that a confidence score of a region in the training space is above a threshold; and decreasing a weight for a classification loss of the region.

11. A system for training a machine learning model, the system comprising:

a processor; and one or more non-transitory computer-readable storage media storing instructions executable by the processor to perform operations, the operations comprise:

training the machine learning model for a first training period with a first training set, the machine learning model trained to receive spaces in images as inputs and to output a plurality of class predictions for the spaces in the images, wherein a space is at least part of one or more images;

identifying a training space having a plurality of regions, wherein a region is a portion of an image;

for each region in the plurality of regions, applying the machine learning model to the region to generate one or more class predictions, and determining a confidence score for the region based on the one or more class predictions for the region, the confidence score indicating a confidence of the machine learning model on the one or more class predictions; and further training, based on the confidence score for each region in the plurality of regions, the machine learning model for a second training period with a second training set, wherein the second training period is after the first training period, the second training set comprises the training space, and further training the machine learning model comprises:

generating a modified classification loss by modifying a classification loss of each region in the training space based on the confidence score for each region, and using the modified classification loss to determine one or more values of one or more parameters of the machine learning model.

12. The system of claim 11, wherein further training the machine learning model for the second training period comprises:

grouping the plurality of regions into region subsets corresponding to known classifications for the plurality of regions;

for each region subset, determining a ratio describing a proportion of the subset having a confidence score below a threshold;

generating a modified space from the space by comparing the ratio for each region subset with a threshold and removing the region subset from the modified space when the ratio is below the threshold;

forming a second training set that comprises the modified space; and further training the machine learning model for the second training period with the second training set.

13. The system of claim 12, wherein each region subset included in the modified space includes padding around the region subset.

14. The system of claim 11, wherein further training the machine learning model for the second training period comprises:

grouping the plurality of regions into region subsets corresponding to known classifications for the plurality of regions;

for each region subset, determining a ratio describing a proportion of the subset having a confidence score below a threshold; and determining a confidence modifier of each region based on the ratio of the region subset associated with the region, wherein modifying the classification loss of each region in the training space comprises modifying the classification loss of each region in the training space with the confidence modifier for the region.

15. The system of claim 14, wherein the operations further comprise: assigning each region subset to a high-confidence group or a low-confidence group, wherein the confidence modifier for each region is determined based on whether the region is grouped with a subset assigned to the high-confidence group or the low-confidence group.

16. The system of claim 11, wherein the modified classification loss is $$L = \frac{1}{N}\sum_{i=0}^{N}\begin{cases} b_{low} * CE(f_{softmax}[i], g[i]) & \text{for } s_i \in HCG \\ b_{high} * CE(f_{softmax}[i], g[i]) & \text{for } s_i \in LCG \end{cases}$$

wherein L is the modified classification loss across each region i,

N is the number of regions in the space,

CE is a cross-entropy classification loss in which g[i] is the known label for region i, $s_i$ is the region subset of a region, belonging to the high-confidence group (HCG) or the low-confidence group (LCG), $b_{low}$ is the confidence modifier for the high-confidence group and $b_{high}$ is the confidence modifier for the low-confidence group.

17. The system of 11, wherein the modified classification loss is $$L = \frac{1}{N}\sum_{i=0}^{N}(1 - f_{conf}[i])\ CE(f_{softmax}[i], g[i])$$

where L is the modified classification loss across each region i,

N is the number of regions in the space, $f_{conf}$ is a function for the confidence score, and CE is the classification loss in which g[i] is the known label for region i.

18. The system of claim 17, wherein the $(1 - 71_{conf}[i])$ factor includes a training modifier λ based on a number of training iterations.

19. One or more non-transitory computer-readable storage media storing instructions executable to perform operations for training a machine learning model, the operations comprise:

training the machine learning model for a first training period with a first training set, the machine learning model trained to receive spaces in images as inputs and to output a plurality of class predictions for the spaces in the images, wherein a space is at least part of one or more images;

identifying a training space having a plurality of regions, wherein a region is a portion of an image;

for each region in the plurality of regions of the training space, applying the machine learning model to the region to generate one or more class predictions, and determining a confidence score for the region based on the one or more class predictions for the region, the confidence score indicating a confidence of the machine learning model on the one or more class predictions; and further training, based on the confidence score for each region in the plurality of regions, the machine learning model for a second training period with a second training set, wherein the second training period is after the first training period, the second training set comprises the training space, and further training the machine learning model comprises:

generating a modified classification loss by modifying a classification loss of each region in the training space based on the confidence score for each region, and using the modified classification loss to determine one or more values of one or more parameters of the machine learning model.

20. The one or more non-transitory computer-readable storage media of claim 19, wherein further training the machine learning model for the second training period comprises:

grouping the plurality of regions into region subsets corresponding to known classifications for the plurality of regions;

for each region subset, determining a ratio describing a proportion of the subset having a confidence score below a threshold;

generating a modified space from the space by comparing the ratio for each region subset with a threshold and removing the region subset from the modified space when the ratio is below the threshold;

forming a second training set that comprises the modified space; and further training the machine learning model for the second training period with the second training set.

21. The one or more non-transitory computer-readable storage media of claim 20, wherein each region subset included in the modified space includes padding around the region subset.

22. The one or more non-transitory computer-readable storage media of claim 19, wherein further training the machine learning model for the second training period comprises:

grouping the plurality of regions into region subsets corresponding to known classifications for the plurality of regions;

for each region subset, determining a ratio describing a proportion of the subset having a confidence score below a threshold; and determining a confidence modifier of each region based on the ratio of the region subset associated with the region, wherein modifying the classification loss of each region in the training space comprises modifying the classification loss of each region in the training space with the confidence modifier for the region.

23. The one or more non-transitory computer-readable storage media of claim 22, wherein the operations further comprise: assigning each region subset to a high-confidence group or a low-confidence group;

wherein the confidence modifier for each region is determined based on whether the region is grouped with a subset assigned to the high-confidence group or the low-confidence group.

* * * * *

UNITED STATES PATENT AND TRADEMARK OFFICE
CERTIFICATE OF CORRECTION

PATENT NO. : 11,875,555 B2  
APPLICATION NO. : 17/534558  
DATED : January 16, 2024  
INVENTOR(S) : Anirud Thyagharajan et al.

Page 1 of 1

It is certified that error appears in the above-identified patent and that said Letters Patent is hereby corrected as shown below:

In the Claims

In Column 27, Claim 6, Line 41, delete "$L = \frac{1}{N}\sum_{i=0}^{N} \begin{cases} b_{low} * CE(f_{softmax}[i], g[i]) & \text{for } s_i \in HCG \\ b_{high} * CE(f_{softmax}[i], g[i]) & \text{for } s_i \in LCG \end{cases}$" and insert -- $L = \frac{1}{N}\sum_{i=0}^{N} \begin{cases} b_{low} * CE(f_{softmax}[i], g[i]) & for\ s_i \in HCG \\ b_{high} * CE(f_{softmax}[i], g[i]) & for\ s_i \in LCG \end{cases}$ --, therefor.

In Column 28, Claim 8, Line 8, delete "modifier λ" and insert -- modifier γ --, therefor.

In Column 29, Claim 16, Line 36, delete "$L = \frac{1}{N}\sum_{i=0}^{N} \begin{cases} b_{low} * CE(f_{softmax}[i], g[i]) & \text{for } s_i \in HCG \\ b_{high} * CE(f_{softmax}[i], g[i]) & \text{for } s_i \in LCG \end{cases}$" and insert -- $L = \frac{1}{N}\sum_{i=0}^{N} \begin{cases} b_{low} * CE(f_{softmax}[i], g[i]) & for\ s_i \in HCG \\ b_{high} * CE(f_{softmax}[i], g[i]) & for\ s_i \in LCG \end{cases}$ --, therefor.

In Column 29, Claim 17, Line 54, delete "system of 11," and insert -- system of claim 11, --, therefor.

In Column 30, Claim 18, Line 1, delete "(1-71 $_{conf}$[i])" and insert -- 1 – $f_{conf}[i]$) --, therefor.

In Column 30, Claim 18, Line 2, delete "modifier λ" and insert -- modifier γ --, therefor.

Signed and Sealed this  
Twentieth Day of February, 2024

Katherine Kelly Vidal  
*Director of the United States Patent and Trademark Office*